(12) United States Patent
Nikolov et al.

(10) Patent No.: US 7,142,375 B2
(45) Date of Patent: Nov. 28, 2006

(54) FILMS FOR OPTICAL USE AND METHODS OF MAKING SUCH FILMS

(75) Inventors: Anguel N. Nikolov, Bridgewater, NJ (US); Jian Jim Wang, Orefield, PA (US); Xu Ouyang, Painted Post, NY (US); Feng Liu, Allentown, PA (US); Jiangdong Deng, Kendall Park, NJ (US); Xuegong Deng, Piscataway, NJ (US); Greg E. Bionder, Summit, NJ (US); Ronnie Paul Varghese, Annandale, NJ (US)

(73) Assignee: NanoOpto Corporation, Somerset, NJ (US)

( * ) Notice: Subject to any disclaimer, the term of this patent is extended or adjusted under 35 U.S.C. 154(b) by 0 days.

(21) Appl. No.: 10/843,168

(22) Filed: May 10, 2004

(65) Prior Publication Data

US 2005/0180014 A1 Aug. 18, 2005

Related U.S. Application Data

(60) Provisional application No. 60/544,089, filed on Feb. 12, 2004.

(51) Int. Cl.
 *G02B 1/10* (2006.01)
 *G02B 9/34* (2006.01)

(52) U.S. Cl. ............................ 359/722; 359/581

(58) Field of Classification Search ............... 359/359, 359/581, 722
 See application file for complete search history.

(56) References Cited

U.S. PATENT DOCUMENTS

| | | | |
|---|---|---|---|
| 5,608,227 A | 3/1997 | Dierks et al. | |
| 5,638,197 A | 6/1997 | Gunning et al. | 349/96 |
| 5,851,849 A | 12/1998 | Comizzoli et al. | 438/38 |
| 5,852,688 A | 12/1998 | Brinkman et al. | 385/16 |
| 6,243,201 B1 | 6/2001 | Fleming et al. | |
| 6,243,203 B1 | 6/2001 | Schleipen et al. | |
| 6,462,866 B1 * | 10/2002 | Sugiyama et al. | 359/359 |
| 6,576,053 B1 | 6/2003 | Kim et al. | 117/89 |
| 6,613,695 B1 | 9/2003 | Pomarede et al. | 438/767 |
| 6,618,104 B1 | 9/2003 | Date et al. | 349/86 |
| 6,661,952 B1 | 12/2003 | Simpson et al. | 385/37 |
| 6,692,797 B1 | 2/2004 | Owen et al. | 428/0.12 |
| 6,791,758 B1 * | 9/2004 | Scobey | 359/584 |
| 2001/0051443 A1 | 12/2001 | Koo | 438/765 |
| 2002/0003664 A1 | 1/2002 | Mearini et al. | 359/568 |
| 2002/0012172 A1 | 1/2002 | Steinberg et al. | 359/577 |
| 2003/0022425 A1 | 1/2003 | Tungare | 438/197 |
| 2003/0026575 A1 | 2/2003 | Lempkowski | 385/131 |
| 2003/0227597 A1 | 12/2003 | Silverstein et al. | 353/20 |
| 2004/0043149 A1 | 3/2004 | Gordon et al. | 427/255.31 |

(Continued)

FOREIGN PATENT DOCUMENTS

JP      11202126 A    *   7/1999

OTHER PUBLICATIONS

Bokor et al. "Achromatic phase retarder by slanted illumination of a dielectric grating with period comparable with the wavelength." Applied Optics, 40:13, pp. 2076-2080, May 1, 2001.

(Continued)

*Primary Examiner*—David N. Spector
(74) *Attorney, Agent, or Firm*—Fish & Richardson P.C.

(57) ABSTRACT

Films for optical use, articles containing such films, methods for making such films, and systems that utilize such films, are disclosed.

22 Claims, 9 Drawing Sheets

U.S. PATENT DOCUMENTS

2004/0208994 A1 10/2004 Harkonen et al. ....... 427/249.1
2005/0127840 A1 6/2005 Chowdhury et al.

OTHER PUBLICATIONS

Cescato et al. "Holographic quarterwave plates." Applied Optics, 29:22, pp. 3286-3290, Aug. 1, 1990.

Enger et al. "Optical elements with ultrahigh spatial-frequency surface corrugations." Applied Optics, 22:20, pp. 3220-3228, Oct. 15, 1983.

Flanders, Dale C. "Submicrometer periodicity gratings as artificial anisotrophic dielectrics." Appl. Phys. Lett., 42:6, pp. 492-494, Mar. 15, 1983.

Guo, L. Jay. "Recent progress in nanoimprint technology and its applications." Journal of Physics D: Applied Physics. 37,pp. R123-R141, 2004.

Hausmann et al. "Rapid Vapor Deposition of Highly Conformal Silica Nanolaminates." Science. 298, pp. 402-406, Oct. 11, 2002.

Kikuta et al. "Archromatic quarter-wave plates using the dispersion of form birefringence." Applied Optics. 36:7, pp. 1566-1572, Mar. 1, 1997.

Lugmair et al. "New Tris (tert-butoxy)silixy Complexes of Aluminum and Their Transformation to Homogeneous Aluminosilicate Materials via Low-Temperature Thermolytic Pathways." Chem. Mater., 14, pp. 888-898, 2002.

Tyan et al. "Design, fabrication, and characterization of form-birefringent multilayer polarizing beam splitter." J. Opt. Soc. Am. A, 14:7, pp. 1627-1636, Jul. 1997.

Tyan et al. "Polarizing beam splitter based on the anisotropic spectral relectivity characteristic of form-birefringent multiplayer gratings." Optics Letters, 21:10, 761-763, May 15, 1996.

Tyan et al. "Subwavelength Multilayer Binary Grating Design for Implementing Photonic Crystals." OSA Tech Digest Series, 9, Topical Meeting on Quantum Optoelectronics, 1997.

Zaitsu et al. "Optical thin films consisting of nanoscale laminated layers." Appl. Phys. Lett., 80:14, pp. 2442-2444, Apr. 8, 2002.

* cited by examiner

FILMS FOR OPTICAL USE AND METHODS OF MAKING SUCH FILMS

CROSS-REFERENCE TO RELATED APPLICATIONS

This application claims priority under 35 U.S.C. §119 to U.S. Provisional Patent Application Ser. No. 60/544,089, entitled "ATOMIC LAYER DEPOSITION FOR HIGH QUALITY OPTICAL COATINGS," and filed on Feb. 12, 2004, the entire contents of which are hereby incorporated by reference.

TECHNICAL FIELD

This invention relates to films for optical use, articles containing such films, methods for making such films, and systems that utilize such films.

BACKGROUND

Optical devices and optical systems are commonly used where manipulation of light is desired. Examples of optical devices include lenses, polarizers, optical filters, antireflection films, retarders (e.g., quarter-waveplates), and beam splitters (e.g., polarizing and non-polarizing beam splitters).

SUMMARY

This invention relates to films for optical use, articles containing such films, methods for making such films, and systems that utilize such films.

In one aspect, the invention features a method for forming film on a substrate, including forming a layer of a first material by sequentially depositing a plurality of monolayers of the first material, one of the monolayers of the first material being deposited on a first surface of the substrate, wherein the film includes the layer of the first material and the substrate includes a polymer.

In another aspect, the invention features a method for forming a multilayer film on an optical component, including forming a layer of a first material by sequentially depositing a plurality of monolayers of the first material, one of the monolayers of the first material being deposited on a first surface of the optical component, and forming a layer of a second material by sequentially depositing a plurality of monolayers of the second material, one of the monolayers of the second material being deposited on a surface of the layer of the first material, wherein the multilayer film includes the layers of the first material and second material and the optical component is a lens.

In another aspect, the invention features a method, including using atomic layer deposition to simultaneously deposit a film on first and second surfaces of a substrate, the first surface being opposite the second surface.

In another aspect, the invention features a method, including using atomic layer deposition to simultaneously deposit a layer of a first material on first and second surfaces of an optical substrate, the first surface being opposite the second surface.

In another aspect, the invention features a method, including using atomic layer deposition to deposit a multilayer film on a surface of a substrate comprising a polymer.

In another aspect, the invention features a method for forming a film on a substrate, including forming a layer of a first material by sequentially depositing a plurality of monolayers of the first material, one of the monolayers of the first material being deposited on a first surface of the substrate, wherein the film comprises the layer of the first material and the substrate comprises a lens.

In another aspect, the invention features a method for forming a film on a substrate comprising a curved surface, including forming a layer of a first material by sequentially depositing a plurality of monolayers of the first material, one of the monolayers of the first material being deposited on the curved surface of the substrate, wherein the film comprises the layer of the first material.

In another aspect, the invention features a method for forming a film on a substrate, including forming a layer of a first material by sequentially depositing a plurality of monolayers of the first material, one of the monolayers of the first material being simultaneously deposited on first and second surfaces of the substrate, wherein the film comprises the layer of the first material and the first surface is opposite the second surface.

In another aspect, the invention features a method for forming a film on a substrate, including forming a layer of a first material by sequentially depositing a plurality of monolayers of the first material, one of the monolayers of the first material being simultaneously deposited on first and second non-coplanar surfaces of the substrate, wherein the film comprises the layer of the first material and the first surface is contiguous with the second surface.

In another aspect, the invention features a method, including using atomic layer deposition to deposit a multilayer film on a surface of a lens.

In another aspect, the invention features a method, including using atomic layer deposition to deposit a multilayer film on a curved or structured surface.

Embodiments can include one or more of the following features.

Depositing the plurality of monolayers of the first material can include depositing a monolayer of a precursor and exposing the monolayer of the precursor to a reagent to provide a monolayer of the first material. The reagent can chemically react with the precursor to form the first material. For example, the reagent can oxidize the precursor to form the first material. Depositing the monolayer of the precursor can include introducing a first gas comprising the precursor into a chamber housing the substrate. A pressure of the first gas in the chamber can be about 0.01 to about 100 Torr. Exposing the monolayer of the precursor to the reagent can include introducing a second gas comprising the reagent into the chamber. A pressure of the second gas in the chamber can be about 0.01 to about 100 Torr. A third gas can be introduced into the chamber after the first gas is introduced and prior to introducing the second gas. The third gas can be inert with respect to the precursor. The third gas can include at least one gas selected from the group consisting of helium, argon, nitrogen, neon, krypton, and xenon. The precursor can be selected from the group consisting of tris(tert-butoxy) silanol, $(CH_3)_3Al$, $TiCl_4$, $SiCl_4$, $SiH_2Cl_2$, $TaCl_3$, $AlCl_3$, Hf-ethaoxide and Ta-ethaoxide. The first material can be a dielectric material.

The methods can include forming a layer of a second material by sequentially depositing a plurality of monolayers of the second material, one of the monolayers of the second material being deposited on the layer of the first material, wherein the second material is different from the first material and the film comprises the layer of the second material. Depositing the plurality of monolayers of the second material can include depositing a monolayer of a precursor and exposing the monolayer of the precursor to a reagent to provide a monolayer of the second material. The reagent can chemically react with the precursor to form the second material. For example, the reagent can oxidize the precursor to form the second material. Depositing the monolayer of the precursor can include introducing a first gas comprising the precursor into a chamber housing the substrate. A pressure of the first gas in the chamber can be about 0.01 to about 100 Torr. Exposing the monolayer of the precursor to the reagent can include introducing a second gas comprising the reagent into the chamber. A pressure of the second gas in the chamber can be about 0.01 to about 100 Torr. The chamber can be purged with a purge gas after the first gas is introduced and prior to introducing the second gas. The purge gas can be inert with respect to the first precursor. The purge gas can include at least one gas selected from the group consisting of helium, argon, nitrogen, neon, krypton, and xenon. The precursor can be selected from the group consisting of tris(tert-butoxy)silanol, $(CH_3)_3Al$, $TiCl_4$, $SiCl_4$, $SiH_2Cl_2$, $TaCl_3$, $AlCl_3$, Hf-ethaoxide and Ta-ethaoxide. The second material can be a dielectric material.

The methods can further include forming a layer of a third material on a surface of the layer of the second material, wherein the third material is different from the second material and the film includes the layer of the third material. The third material can be the same as the first material. The layer of the third material can be deposited using atomic layer deposition. The method can also include forming a layer of a fourth material on a surface of the layer of the third material, wherein the fourth material is different from the third material and the film includes the layer of the fourth material. The fourth material can be the same as the second material. The layer of the fourth material can be deposited using atomic layer deposition. The methods can include forming additional layers that are supported by the layer of the fourth material. The additional layers can be formed using atomic layer deposition.

The substrate can be an optical component. The methods can include forming a layer of the first material on a second surface of the substrate simultaneously to forming the layer of the first material on the first surface, wherein the second surface is opposite or contiguous with the first surface. The layer of the first material can be formed on the second surface by sequentially depositing a plurality of monolayers of the first material, one of the monolayers of the first material being deposited on the second surface of the substrate.

The methods can include forming a layer of the second material on a layer of the first material deposited on a second surface of the substrate simultaneously to forming the layer of the second material on the layer of the first material on the first surface, wherein the second surface is opposite or contiguous with the first surface. The layer of the second material can be formed on the layer of the first material deposited on the second surface by sequentially depositing a plurality of monolayers of the second material, one of the monolayers of the second material being deposited on a surface of the layer of the first material deposited on the second surface.

While forming the layer of the first material, the substrate can have a temperature of about 500° C. or less (e.g., about 300° C. or less, about 200° C. or less, about 150° C. or less, about 100° C. or less, about 80° C. or less, about 70° C. or less, about 60° C. or less, about 50° C. or less).

In embodiments where the substrate includes a polymer, the polymer can be a thermoset polymer or a thermoplastic polymer.

In a further aspect, the invention features an article, including a substrate having a first surface and a second surface contiguous with the first surface, the first and second surfaces being non-coplanar, a first multilayer film disposed on the first surface, and a second multilayer film disposed on the second surface, wherein the second multilayer film is contiguous with the first multilayer film.

In another aspect, the invention features an article, including an optical component having a first surface and a second surface opposite the first surface, a layer of a first material disposed on the first surface, and a layer of the first material disposed on the second surface, wherein a perpendicular optical thickness of the layer of the first material at a location on the first surface is within about five percent of a perpendicular optical thickness of the layer of the first material on a corresponding location on the second surface.

In another aspect, the invention features an article, including a substrate having a surface that has a radius of curvature of about 10 meters or less, wherein the surface has a first location and a second location and an angle between a surface normal at the first and second locations is about two degrees or more; and a film disposed on the surface, wherein the film includes a layer of a first material and a perpendicular optical thickness of the layer at the first location is within about one percent of a perpendicular optical thickness of the layer at the second location.

In another aspect, the invention features an article, including a substrate having a first surface and a second surface opposite the first surface, a first film disposed on the first surface, and a second film disposed on the second surface, wherein a perpendicular optical thickness of the first film at a location on the first surface is within about five percent of a perpendicular optical thickness of the second film at a corresponding location on the second surface.

In another aspect, the invention features an article, including a substrate comprising a polymer, and a multilayer film disposed on a first surface of the substrate.

In another aspect, the invention features an optical filter, including a multilayer film defining an optical axis, wherein the optical filter transmits 50% of light having a wavelength $\lambda_1$ propagating along the optical axis, and the optical filter transmits 50% of light having a wavelength $\lambda_2$ incident on the multilayer film at an angle of 30 degrees with respect to the optical axis, wherein $|\lambda_1 - \lambda_2|$ is about 30 nm or less.

Embodiments may include one or more of the following features.

The first and second multilayer films can include a contiguous layer of a first material. The first and second multilayer films can include a contiguous layer of a second material, wherein the second material is different from the first material and the contiguous layer of the second material is supported by the contiguous layer of the first material. The first and second multilayer films can include three or more contiguous layers, wherein adjacent layers are formed from different materials.

The substrate can be an optical component (e.g., a lens, such as a Fresnel lens, an optical flat). The substrate can include a glass. The glass can be selected from the group consisting of borosilicate glass, glass-ceramic, quartz, fused silica, and soda-lime glass. Alternatively, or additionally, the substrate can include a polymer (e.g., a thermoset polymer or a thermoplastic polymer). The polymer can be selected from the group consisting of polycarbonate, acrylic, polyester, polyethylene, polypropylene, polyvinylchloride, and polymethylemethacrylate. The substrate can include a material that has a glass transition temperature of about 250° C. or less (e.g., about 200° C. or less, about 150° C. or less, about 100° C. or less, about 80° C. or less). The substrate can include a substrate material having a coefficient of thermal expansion within ten percent of a coefficient of thermal expansion of the first material for temperatures between about 0° C. and 300° C. The surface can have a radius of curvature of about 100 meters or less. Alternatively, the surface can be substantially planar. The surface can be a structured surface. The first material can be a dielectric material. The first material can be an oxide. For example, the oxide can be a metal oxide. In some embodiments, the metal oxide is selected from the group consisting of $SiO_2$, $Al_2O_3$, $Nb_2O_5$, $TiO_2$, $ZrO_2$, $HfO_2$ and $Ta_2O_5$.

The contiguous layer can have a perpendicular optical thickness of about 1 nm or more (e.g., about 10 nm or more, about 20 nm or more). In some embodiments, the contiguous layer can have a perpendicular optical thickness of about 5,000 nm or less (e.g., about 1,000 nm or less, about 500 nm or less).

The first and second multilayer films are antireflection films. In some embodiments, the article is an optical filter. The optical filter can be an infrared filter. The infrared filter can reduce transmission of light having wavelengths from about 650 nm to about 1,100 nm through the article. The optical filter can be an ultraviolet filter. The ultraviolet filter can reduce transmission of light having wavelengths from less than about 400 nm through the article.

A refractive index of the first material can be different from a refractive index of the second material. A perpendicular optical thickness of the contiguous layer of the first material can be the same as a perpendicular optical thickness of the contiguous layer of the second material. Alternatively, a perpendicular optical thickness of the contiguous layer of the first material can be different from a perpendicular optical thickness of the contiguous layer of the second material. The article can include a third multilayer film disposed on a third surface of the substrate, the third surface being opposite the first surface. The first, second, and third multilayer films can be identical.

In some embodiments, $\lambda_1$ is about 650 nm.

In a further aspect, the invention features an optical system, including a lens for imaging light from an object to an image plane, and an optical filter comprising a plurality of layers positioned relative to the lens to reduce an amount of focused light of a wavelength $\lambda$ by about 20 percent or more at the image plane relative to an identical optical system without the optical filter, wherein one of the layers is disposed on a first surface of the lens.

In another aspect, the invention features an optical system, including an optical filter positioned relative a lens and an image plane, wherein the optical filter includes a substrate having first and second surfaces, wherein the first surface is opposite the second surface, and a first and second multilayer film disposed on the first and second surfaces, respectively, wherein the first multilayer film is identical to the second multilayer film.

In another aspect, the invention features a digital camera including one of the optical systems.

In a further aspect, the invention features a cell phone including the digital camera.

Embodiments can include one or more of the following features.

The first surface can have a radius of curvature of about two meters or less. The image plane can be about 5 cm or less from the lens (e.g., about 1 cm or less, about 0.5 cm or less). The optical systems can include a detector positioned at the image plane. The detector can be a charge coupled device (CCD) array or complementary metal oxide semiconductor (CMOS) array. The optical filter can be disposed on a surface of the detector.

The plurality of layers can include a plurality of dielectric layers. Alternating layers of the plurality of layers can have different refractive indices. The plurality of layers can include a layer disposed on a second surface of the lens opposite the first surface. $\lambda$ can be about 650 nm or more. For example, $\lambda$ can be between about 650 nm and 1,100 nm. The optical filter can reduce focused light of wavelength $\lambda$ by about 50 percent or more at the image plane (e.g., about 80 percent or more, about 90 percent or more, about 95 percent or more).

The optical systems can include a second lens for imaging light from the object to the image plane. One of the layers of the optical filter can be disposed on a surface of the second lens. Rays of imaged light can have a maximum divergence of about 20 degrees or less at the first surface (e.g., about 15 degrees or less, about 10 degrees or less). The optical filter can be positioned between the lens and the image plane.

Embodiments of the invention may include one or more of the following advantages.

In some embodiments, the film can include one or more layers that are highly uniform (e.g., highly uniform thickness, highly uniform refractive index), which can, for example, result in a film which itself is highly uniform (e.g., highly uniform thickness, highly uniform refractive index). An article, such as an optical device, containing one or more such films can exhibit enhanced performance. As an example, an optical filter containing one or more such films can be highly effective at blocking undesired wavelengths while also being highly effective at transmitting desired wavelengths.

Highly uniform layers can be repeatably deposited from deposition to deposition, providing multilayer films which are highly uniform (e.g., highly uniform thickness, highly uniform refractive index) and providing films on different substrates which have layers that are highly uniform (e.g., highly uniform thickness, highly uniform refractive index). Articles, such as optical devices, containing such films can be-manufactured to conform to tight uniformity specifications. As an example, optical filters containing such films can perform within stringent optical performance specifications. For example, the position of a transmission band edge for a batch of optical filters containing such films can be substantially the same for each filter.

In certain embodiments, a film can include one or more layers that are conformal layers supported by a substrate. The conformal layer(s) can also be highly uniform (e.g., have highly uniform thickness). An article, such as an optical device, having containing one or more optical such films can exhibit enhanced performance. As an example, a structured surface of a Fresnel lens can be coated with an antireflection (AR) film, providing enhanced performance of the lens. An AR film on such a lens can reduce "ghosting," which can occur due to unwanted reflections at the structured surface of the lens. As another example, a highly uniform film (e.g., highly uniform thickness, highly uniform refractive index) can be deposited on a curved surface, such as on the surface of a ball lens or the inner surface of an integrating sphere.

In some embodiments, the methods can allow for multiple (e.g., opposite) surfaces of a substrate to be deposited at the same time. This can reduce the cost and/or complexity associated with depositing the films. This can also allow for multiple, substantially identical films to be formed on different surfaces of the substrate, reduce deposition time, and/or reduce excessive handling of a substrate. An article, such an optical device, formed using such a method can meet tight optical specifications. As an example, an AR film can be coated onto multiple surfaces of a substrate (e.g., a lens, a prism, or an optical flat) during a single deposition run.

In certain embodiments, the methods can be used to partially or fully encapsulate a substrate. This can be advantageous, for example, when it is desirable to protect the substrate from its environment (e.g., when exposing the substrate to the environment could be detrimental to the performance characteristics of the substrate).

In some embodiments, the methods are compatible with thermally unstable substrates (e.g., polymer substrate with glass transition temperatures of about 300° or less).

In certain embodiments, the methods can be used to form integrated optical components (e.g., a lens that also serves as the substrate for one or more films, such as films that form an optical filter). Such integrated components can be used to reduce the number of discrete components present in an optical system designed for a particular purpose. This can, for example, reduce the size, cost and/or complexity of an optical system.

Other features, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
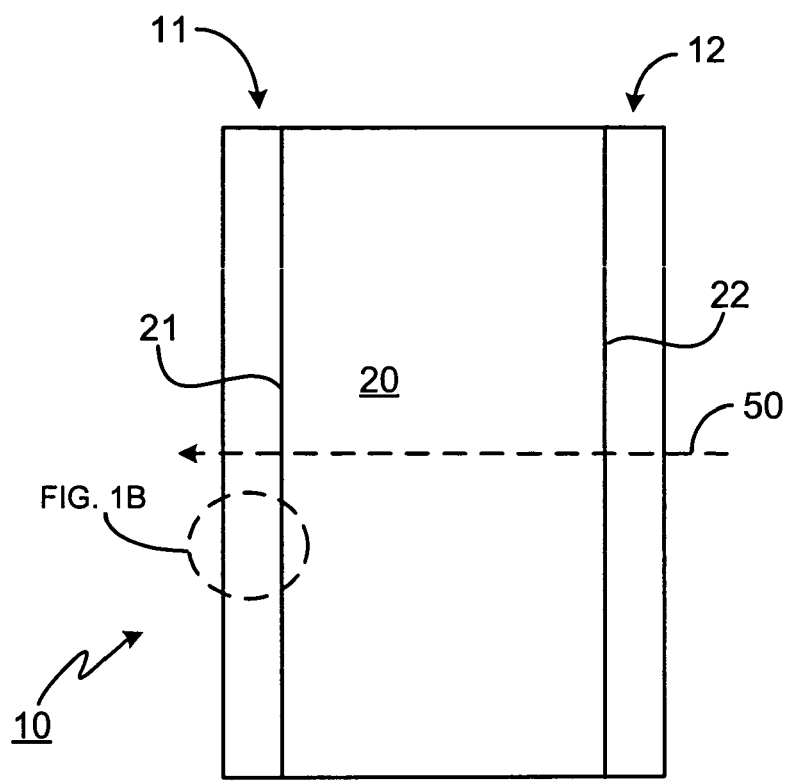
FIG. 1A is a cross-sectional view of an optical filter.

Referring to FIG. 1A, an optical filter 10 is composed of two multilayer films 11 and 12, disposed on opposite surfaces 21 and 22 of a substrate 20 (e.g., a glass optical flat). Optical filter 10 substantially reflects light of certain wavelengths impinging on the filter propagating along an axis 50, and substantially transmits light of other wavelengths. Optical filter 10 also reflects light of certain wavelengths imping- ing on the filter at an angle to axis 50, while transmitting light of other wavelengths. Both multilayer films 11 and 12 include a number alternating high refractive index and low refractive index layers formed from dielectric materials.

Figure 1B:
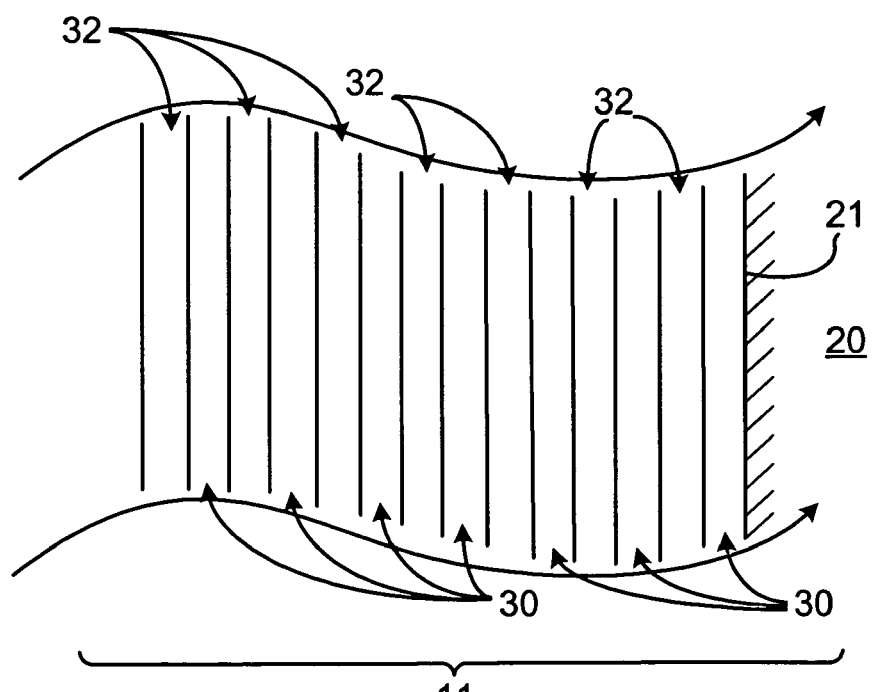
FIG. 1B is a cross-sectional view of a portion of the optical filter shown in FIG. 1A.

The structure of multilayer film 11 is shown in FIG. 1B. Multilayer film 11 is composed of seven high index layers 30 and seven low index layers 32. The composition and structure of multilayer film 12 is the same as multilayer film 11. In other words, both multilayer films include the same number of dielectric layers, and the composition and thickness of corresponding layers in the films is the same. As used herein, corresponding layers refer to layers in multilayer films 11 and 12 that are in the same relative position within the multilayer film.

The thickness and composition of each layer in multilayer films 11 and 12 depend on the desired spectral characteristics of optical filter 10. In some cases, the thickness of each layer is about 0.25 $\lambda/n$ where $\lambda$ is a wavelength to be reflected by the filter and n is the refractive index of the layer. Of course, the thickness of a given layer will vary depending on the refractive index of the material used to form the layer.

In some embodiments, the thickness of each layer can be determined using an algorithm that optimizes the layer thickness based on the desired optical properties of the optical filter. For example, where maximum reflectance across a certain portion of the spectrum is desired, the algorithm can determine reflectance of the filter for different combinations of layers thickness to converge onto a structure in which the reflectance is highest. Examples of commercially available software that can be used to perform such calculations are FilmWizard™, which is available from Scientific Computing International (Carlsbad, Calif.), and TFCalc, available from Software Spectra, Inc. (Portland, Oreg.).

As used herein, the perpendicular thickness of a portion of a layer refers to the thickness of the portion of the layer in a direction normal to the portion of the substrate surface closest to the portion of the layer. Generally, layer thickness (e.g., perpendicular layer thickness) can be determined by studying a cross section of the layer using electron microscopy, ellipsometry or by parametric fitting computational data to spectroscopic data.

As used herein, the perpendicular optical thickness of a portion of a layer refers to the optical thickness of the portion of the layer in a direction normal to the portion of the substrate surface closest to the portion of the layer.

As used herein, the optical thickness of a portion of a layer refers to the product of the thickness of the portion of the layer and the refractive index of the portion. Where the portion of the layer is optically inhomogeneous (i.e., the refractive index varies through the layer along the direction in which the thickness is measured), the optical thickness refers to the refractive index integrated with respect to the thickness. For an optically homogeneous layer, this integral reduces to the previous definition.

In each multilayer film, the perpendicular optical thickness of each layer can be the same as or different than other layers. For example, in embodiments where optical filter 10 is designed to reflect a narrow band of wavelengths (e.g., about 10 nm), the perpendicular optical thickness of each layer can be 0.25 $\lambda_0$, where $\lambda_0$ is the central wavelength in the reflection band. Alternatively, where optical filter 10 is designed to reflect a broad band of wavelengths (e.g., about 100 nm or more, about 150 nm or more, about 200 nm or more), the perpendicular optical thickness of layers can vary. In this example, different groups of layers in each multilayer film can have a perpendicular optical thickness equal to 0.25 $\lambda_t$ for different wavelengths, $\lambda_t$, within the desired reflection band. In some embodiments, the perpendicular optical thickness of each layer can be in the range of about 20 nm to about 1,000 nm. For example, the perpendicular optical thickness of each layer can be about 50 nm or more (e.g., about 100 nm or more, about 150 nm or more, about 200 nm or more, about 250 nm or more, about 300 nm or more). In embodiments, the perpendicular optical thickness of the layers can be about 800 nm or less (e.g., about 600 nm or less, about 500 nm or less).

In general, the perpendicular thickness of each layer in a multilayer film can be substantially uniform. For example, the perpendicular thickness of a given layer can vary by about 2% or less between different portions of a layer (e.g., about 1% or less, about 0.5% or less, about 0.2% or less, about 0.1% or less, about 0.05% or less, about 0.02% or less, about 0.01% or less, 0.001% or less). In some embodiments, the perpendicular thickness of each layer in a multilayer film can vary by about 10 nm or less between different portions of the layer (e.g., about 8 nm or less, about 5 nm or less, about 3 nm or less, about 2 nm or less, about 1 nm or less, about 0.5 nm or less).

Generally, the perpendicular optical thickness of each layer in multilayer films 11 and 12 can be substantially uniform. In some embodiments, a layer can have a perpendicular optical thickness that varies by about 2% or less between different portions of the layer (e.g., about 1% or less, about 0.5% or less, about 0.2% or less, about 0.1% or less, about 0.05% or less, about 0.02% or less, about 0.01% or less, 0.001% or less). The perpendicular optical thickness of one or more deposited layers can vary by about 20 nm or less between different portions of the layer (e.g., about 10 nm or less, about 5 nm or less, about 3 nm or less, about 2 nm or less, about 1 nm or less, about 0.5 nm or less).

As mentioned previously, the thickness and composition of corresponding layers in multilayer films 11 and 12 are substantially the same. For example, the layers in each multilayer film adjacent the substrate surfaces are corresponding layers. In some embodiments, perpendicular layer thickness of corresponding layers can vary by about 2% or less (e.g., about 1% or less, about 0.5% or less, about 0.2% or less, about 0.1% or less, about 0.05% or less, about 0.02% or less, about 0.01% or less, 0.001% or less) at corresponding locations in each multilayer film (e.g., where optical axis 50 intersects each multilayer film). In some embodiments, the perpendicular thickness of one or more corresponding layers can vary by about 10 nm or less (e.g., about 8 nm or less, about 5 nm or less, about 3 nm or less, about 2 nm or less, about 1 nm or less, about 0.5 nm or less) at corresponding locations in multilayer film 11 and multilayer film 12.

Furthermore, the perpendicular optical thickness of corresponding layers in multilayer film 11 and multilayer film 12 can be substantially uniform. In some embodiments, the perpendicular optical thickness of corresponding layers in multilayer films can have a perpendicular optical thickness that varies by about 2% or less between the corresponding layers (e.g., about 1% or less, about 0.5% or less, about 0.2% or less, about 0.1% or less, about 0.05% or less, about 0.02% or less, about 0.01% or less, 0.001% or less). The perpendicular optical thickness of corresponding layers can vary by about 15 nm or less (e.g., about 10 nm or less, about 5 nm or less, about 3 nm or less, about 2 nm or less, about 1 nm or less, about 0.5 nm or less) at corresponding locations in multilayer film 11 and multilayer film 12.

The dielectric materials used to form layers of multilayer films 11 and 12 are selected based on their optical properties (e.g., their refractive index at the wavelengths at which the films are to function, and their absorption at these wavelengths), their compatibility with each other and the substrate, and their compatibility with the process used to manufacture the optical filter. In some embodiments, the dielectric materials include oxides (e.g., metal oxides, fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, $ZnO$, $ErO_2$, $Sc_2O_3$, and $Ta_2O_5$. Examples of fluorides include $MgF_2$. Other examples include ZnS, $SiN_x$, AlN, TiN, and HfN. Alternatively, or additionally, the materials can include non-dielectric materials, such as metals (e.g., Al, Pt, Cu).

Examples of high index materials include $TiO_2$, which has a refractive index of about 2.35 at 632 nm, and $Ta_2O_5$, which has a refractive index of 2.15 at 632 nm. Examples of low index materials include $SiO_2$ and $Al_2O_3$, which have refractive indices of 1.45 and 1.65 at 632 nm, respectively.

In some embodiments, the dielectric materials are substantially amorphous (e.g., about 95% or more, about 98% or more, about 99% or more amorphous). Typically, an amorphous material is optically isotropic and may transmit light better than dielectric layers that are partially or mostly crystalline. In some embodiments, however, some or all of one or both of the dielectric materials may be crystalline.

The optical transmission characteristics of filter 10 can vary depending on a number of design parameters, which include the number of layers in each multilayer film, the optical thickness of each layer, the relative optical thickness of different layers, and the refractive index of each layer. In some embodiments, the filter can be designed to transmit substantially all light within a band of wavelengths impinging on it within a cone of incident angles relative to an optical axis 50, while reflecting substantially all UV, visible, and/or IR wavelengths outside of that band (e.g., all outside the transmission band from about 200 nm to about 2,000 nm). The wavelengths substantially transmitted by the filter are referred to as "pass wavelengths," while the reflected wavelengths are referred to as "block wavelengths." The width of the band of pass wavelengths can be relatively broad (e.g., from about 200 nm to about 300 nm or more), or can be narrow (e.g., from about 0.4 nm to about 20 nm or less).

Figure 1C:
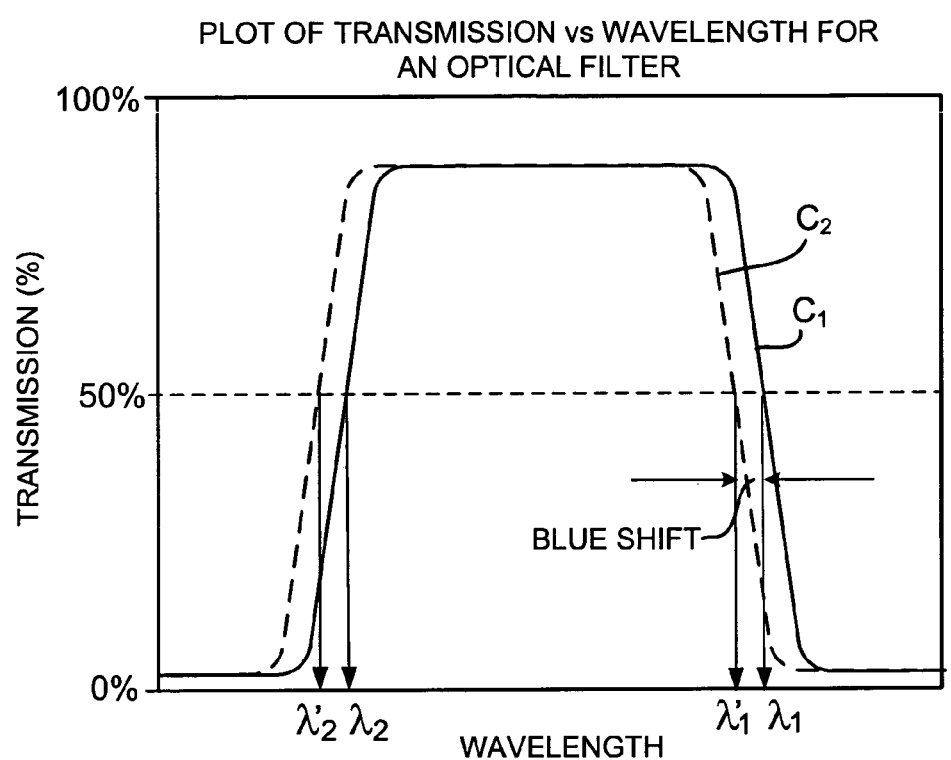
FIG. 1C is a plot of a transmission spectrum for an optical filter showing transmission for on-axis and off-axis incidence.

FIG. 1C shows an exemplary transmission spectrum of an optical filter. Curve C1 corresponds to the transmission of light incident on the optical filter parallel to optical axis 50. For this example, the pass wavelengths for on-axis light correspond to wavelengths between $\lambda_1$ and $\lambda_2$, which correspond to the wavelengths at which the optical filter transmits 50% of incident light. In some embodiments, the band of pass wavelengths can correspond to the visible portion of the electromagnetic spectrum (e.g., from about 400 nm to about 700 nm). The blocked wavelengths can include IR wavelengths (e.g., from about 700 nm to about 2,000 nm).

In some embodiments, optical filter 10 can have high transmission at some or all of the pass wavelengths. For example, transmission at pass wavelengths can be about 95% or more (e.g., about 97% or more, about 98% or more, about 99% or more, about 99.5% or more). In general, the transmission at pass wavelengths depends on the absorption and homogeneity of materials used to form the optical filter, and the uniformity and precision of layer thickness in the multilayer films. For example, materials with relatively high absorption at pass wavelengths can reduce transmission by absorbing light impinging on the filter. Inhomogeneities (e.g., impurities and/or crystalline domains) in the filter can reduce transmission by scattering impinging light. Layer thickness discrepancies can result in coherent reflection of impinging light at pass wavelengths, reducing its transmission. Transmission is further improved by reducing reflectance losses at the interfaces between the optical filter and the atmosphere. In embodiments in which multilayer films are disposed on opposite surfaces of the substrate, they can reduce reflectance of light at transmitted wavelengths compared with optical filters in which only one surface is coated with a multilayer film.

Transmission at all or some of the block wavelengths can be relatively low, such as about 5% or less (e.g., about 4% or less, about 3% or less, about 2% or less, about 1% or less). Increasing the optical filter's reflectance and/or absorption at these wavelengths can reduce transmission at block wavelengths. Increasing the number of layers in each multilayer film and/or increasing the difference in refractive index between the low index and high index layers can increase reflectance of block wavelengths.

In some embodiments, optical filter 10 can have a small blue shift in the transmission band edge for light incident on the filter at non-normal angles. The position of the transmission band edge corresponds to the wavelengths at which the optical filter transmits 50% of light impinging thereon. In FIG. 1C, these correspond to wavelengths $\lambda_1$ and $\lambda_2$ for curve C1. These wavelengths typically vary as a function of the incident angle of the light due to the variation in optical thickness of layers in each multilayer film for off-axis light. The nominal position of the band edge corresponds to normally incident light. The band edge shifts to shorter wavelengths for increasing incident angles—hence the term "blue shift." For example, curve C2 in FIG. 1C shows the transmission spectrum of the filter for light incident on the filter at an angle that is non-parallel to axis 50. In this example, the positions of the band edges have shifted from $\lambda_1$ to $\lambda_1'$ and from $\lambda_2$ to $\lambda_2'$, where $\lambda_1'<\lambda_1$ and $\lambda_2'<\lambda_2$.

The amplitude of the blue shift can be reduced by selecting materials with a relatively high refractive index to form the layers in optical filter 10 (e.g., refractive index of about 1.7 or more, about 1.8 or more, about 1.9 or more, about 2.0 or more). In some embodiments, the blue shift can be about 30 nm or less for light incident at 30 degrees relative to axis 50 (e.g., about 25 nm or less, about 23 nm or less, about 20 nm or less, about 18 nm or less, about 15 nm or less).

Figure 2A:
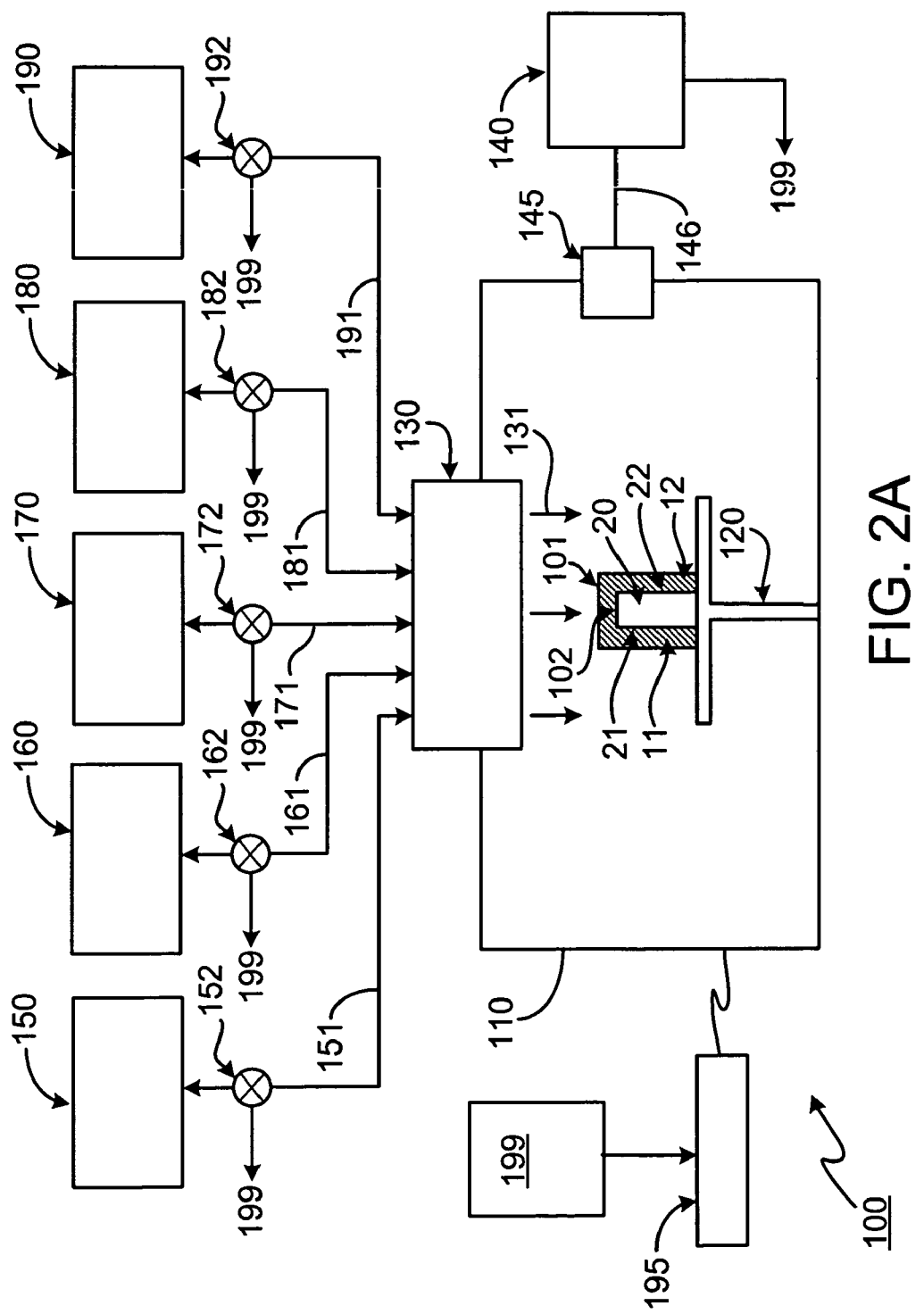
FIG. 2A is a schematic diagram of an atomic layer deposition system.

In general, a multilayer film can be prepared as desired. In some embodiments, multilayer films 11 and 12 can be prepared using atomic layer deposition (ALD). Referring to FIG. 2A, an ALD system 100 is used to deposit multilayer films 11 and 12 on surfaces 21 and 22, respectively, of substrate 20. An additional multilayer film 101 is deposited on exposed surface 102. Optionally, multilayer film 101 can be removed from substrate 20 once the deposition process is completed, to provide optical filter 10 (see FIG. 1A). Deposition of multilayer films 11, 12, and 101 occurs monolayer by monolayer, providing substantial control over the composition and thickness of the films. During deposition of a monolayer, vapors of a precursor are introduced into the chamber and are adsorbed onto substrate surfaces 11, 12, and 102 or previously deposited layers adjacent these surfaces. Subsequently, a reactant is introduced into the chamber that reacts chemically with the adsorbed precursor, forming a monolayer of a desired material. The self-limiting nature of the chemical reaction on the surface can provide precise control of film thickness and large-area uniformity of the deposited layer. Moreover, the non-directional adsorption of precursor onto exposed surfaces provides for uniform deposition of material onto surfaces having different orientations relative to chamber 110.

ALD system 100 includes a reaction chamber 110, which is connected to sources 150, 160, 170, 180, and 190 via a manifold 130. Sources 150, 160, 170, 180, and 190 are connected to manifold 130 via supply lines 151, 161, 171, 181, and 191, respectively. Valves 152, 162, 172, 182, and 192 regulate the flow of gases from sources 150, 160, 170, 180, and 190, respectively. Sources 150 and 180 contain a first and second precursor, respectively, while sources 160 and 190 include a first reagent and second reagent, respectively. Source 170 contains a carrier gas, which is constantly flowed through chamber 110 during the deposition process transporting precursors and reagents to substrate 20, while transporting reaction byproducts away from the substrate. Precursors and reagents are introduced into chamber 110 by mixing with the carrier gas in manifold 130. Gases are exhausted from chamber 110 via an exit port 145. A pump 140 exhausts gases from chamber 110 via an exit port 145. Pump 140 is connected to exit port 145 via a tube 146.

ALD system 100 includes a temperature controller 195, which controls the temperature of chamber 110. During deposition, temperature controller 195 elevates the temperature of substrate 101 above room temperature. In general, the substrate temperature should be sufficiently high to facilitate a rapid reaction between precursors and reagents, but should not damage the substrate. In some embodiments, the substrate temperature can be about 500° C. or less (e.g., about 400° C. or less, about 300° C. or less, about 200° C. or less, about 150° C. or less, about 125° C. or less, about 100° C. or less).

Typically, the substrate temperature should not vary significantly between different portions of substrate 20. Large temperature variations can cause variations in the reaction rate between the precursors and reagents at different portions of the substrate, which can cause variations in the thickness and/or morphology of the deposited layers. In some embodiments, the temperature between different portions of the deposition surfaces can vary by about 40° C. or less (e.g., about 30° C. or less, about 20° C. or less, about 10° C. or less, about 5° C. or less).

Deposition process parameters are controlled and synchronized by an electronic controller 199. Electronic controller 199 is in communication with temperature controller 195; pump 140; and valves 152, 162, 172, 182, and 192. Electronic controller 199 also includes a user interface, from which an operator can set deposition process parameters, monitor the deposition process, and otherwise interact with system 100.

Figure 2B:
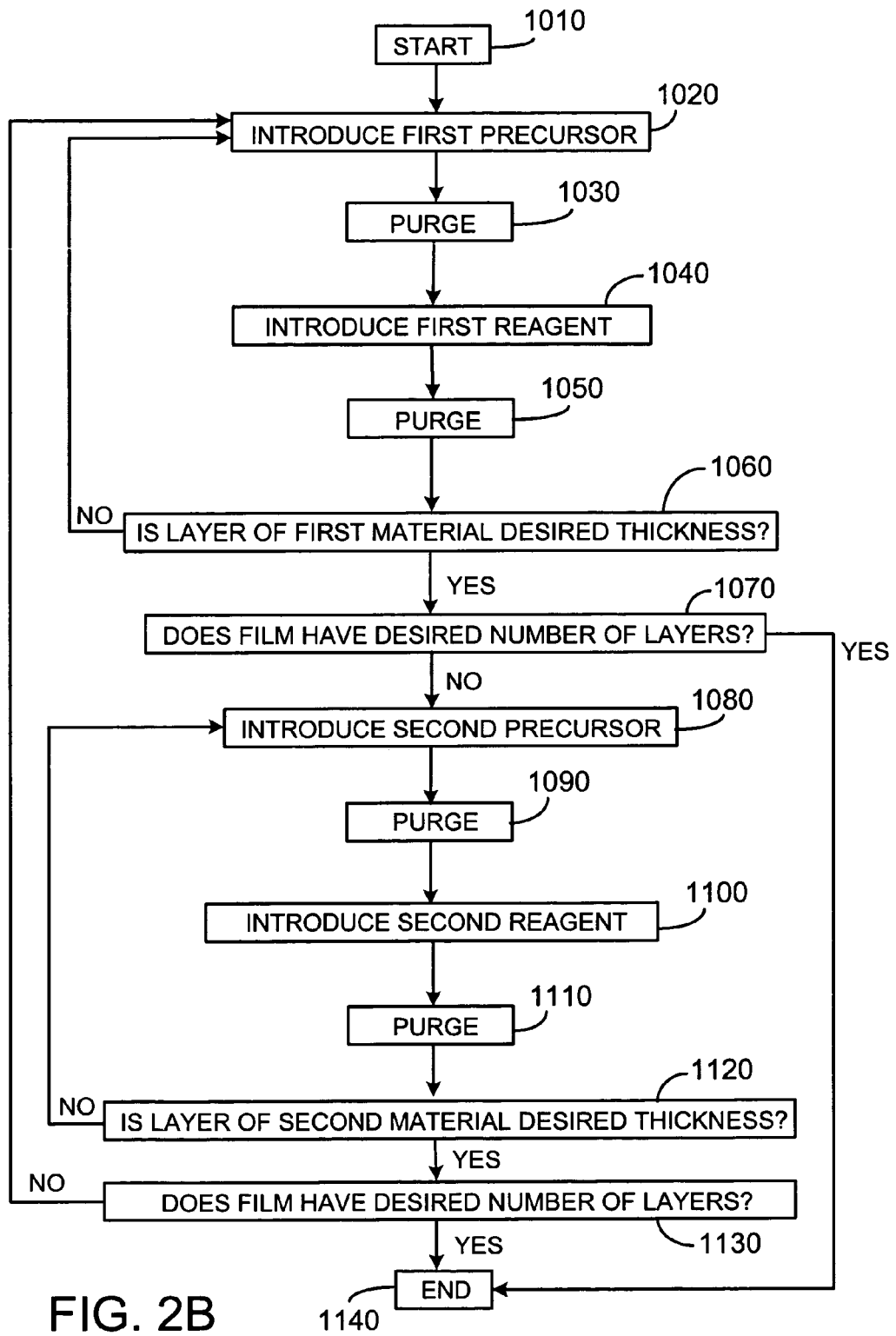
FIG. 2B is a flow-chart summarizing an atomic layer deposition process.

Referring to FIG. 2B, the ALD process is started (1010) when system 100 introduces the first precursor from source 150 into chamber 110 by mixing it with carrier gas from source 170 (1020). A monolayer of the first precursor is adsorbed onto surfaces 21, 22 and 102 of substrate 20, and residual precursor is purged from chamber 110 by the continuous flow of carrier gas through the chamber (1030). Next, the system introduces a first reagent from source 160 into chamber 110 via manifold 130 (1040). The first reagent reacts with the monolayer of the first precursor, forming a monolayer of the first material. As for the first precursor, the flow of carrier gas purges residual reagent from the chamber (1050). Steps 1020 through 1060 are repeated until the layer of the first material reaches a desired thickness (1060).

In embodiments where the films are a single layer of material, the process ceases once the layer of first material reaches the desired thickness (1070). However, where the deposited film is a multilayer film, the system can introduce a second precursor into chamber 110 through manifold 130 (1080). A monolayer of the second precursor is adsorbed onto the exposed surfaces of the deposited layer of first material and carrier gas purges the chamber of residual precursor (1090). The system then introduces the second reagent from source 180 into chamber 110 via manifold 130. The second reagent reacts with the monolayer of the second precursor, forming a monolayer of the second material (1100). Flow of carrier gas through the chamber purges residual reagent (1110). Steps 1080 through 1110 are repeated until the layer of the second material reaches a desired thickness (1120).

Additional layers of the first and second materials are deposited by repeating steps 1020 through 1130. Once the desired number of layers is formed, the process terminates (1140), and the coated substrate is removed from chamber 110.

Although the precursor is introduced into the chamber before the reagent during each cycle in the process described above, in other examples the reagent can be introduced before the precursor. The order in which the precursor and reagent are introduced can be selected based on their interactions with the exposed surfaces. For example, where the bonding energy between the precursor and the surface is higher than the bonding energy between the reagent and the surface, the precursor can be introduced before the reagent. Alternatively, if the binding energy of the reagent is higher, the reagent can be introduced before the precursor.

The thickness of each monolayer generally depends on a number of factors. For example, the thickness of each monolayer can depend on the type of material being deposited. Materials composed of larger molecules may result in thicker monolayers compared to materials composed of smaller molecules.

The temperature of the substrate can also affect the monolayer thickness. For example, for some precursors, a higher temperate can reduce adsorption of a precursor onto a surface during a deposition cycle, resulting in a thinner monolayer than would be formed if the substrate temperature were lower.

The type or precursor and type of reagent, as well as the precursor and reagent dosing can also affect monolayer thickness. In some embodiments, monolayers of a material can be deposited with a particular precursor, but with different reagents, resulting in different monolayer thickness for each combination. Similarly, monolayers of a material formed from different precursors can result in different monolayer thickness for the different precursors.

Examples of other factors which may affect monolayer thickness include purge duration, residence time of the precursor at the coated surface, pressure in the reactor, physical geometry of the reactor, and possible effects from the byproducts on the deposited material. An example of where the byproducts affect the film thickness are where a byproduct etches the deposited material. For example, HCl is a byproduct when depositing $TiO_2$ using a $TiCl_4$ precursor and water as a reagent. HCl can etch the deposited $TiO_2$ before it is exhausted. Etching will reduce the thickness of the deposited monolayer, and can result in a varying monolayer thickness across the substrate if certain portions of the substrate are exposed to HCl longer than other portions (e.g., portions of the substrate closer to the exhaust may be exposed to byproducts longer than portions of the substrate further from the exhaust).

Typically, monolayer thickness is between about 0.1 nm and about five nm. For example, the thickness of one or more of the deposited monolayers can be about 0.2 nm or more (e.g., about 0.3 nm or more, about 0.5 nm or more). In some embodiments, the thickness of one or more of the deposited monolayers can be about three nm or less (e.g., about two nm, about one nm or less, about 0.8 nm or less, about 0.5 nm or less).

The average deposited monolayer thickness may be determined by depositing a preset number of monolayers on a substrate to provide a layer of a material. Subsequently, the thickness of the deposited layer is measured (e.g., by ellipsometry, electron microscopy, or some other method). The average deposited monolayer thickness can then be determined as the measured layer thickness divided by the number of deposition cycles. The average deposited monolayer thickness may correspond to a theoretical monolayer thickness. The theoretical monolayer thickness refers to a characteristic dimension of a molecule composing the monolayer, which can be calculated from the material's bulk density and the molecules molecular weight. For example, an estimate of the monolayer thickness for $SiO_2$ is ~0.37 nm. The thickness is estimated as the cube root of a formula unit of amorphous $SiO_2$ with density of 2.0 g.cm$^{-3}$.

In some embodiments, average deposited monolayer thickness can correspond to a fraction of a theoretical monolayer thickness (e.g., about 0.2 of the theoretical monolayer thickness, about 0.3 of the theoretical monolayer thickness, about 0.4 of the theoretical monolayer thickness, about 0.5 of the theoretical monolayer thickness, about 0.6 of the theoretical monolayer thickness, about 0.7 of the theoretical monolayer thickness, about 0.8 of the theoretical monolayer thickness, about 0.9 of the theoretical monolayer thickness). Alternatively, the average deposited monolayer thickness can correspond to more than one theoretical monolayer thickness up to about 30 times the theoretical monolayer thickness (e.g., about twice or more than the theoretical monolayer thickness, about three time or more than the theoretical monolayer thickness, about five times or more than the theoretical monolayer thickness, about eight times or more than the theoretical monolayer thickness, about 10 times or more than the theoretical monolayer thickness, about 20 times or more than the theoretical monolayer thickness).

During the deposition process, the pressure in chamber 110 can be maintained at substantially constant pressure, or can vary. Controlling the flow rate of carrier gas through the chamber generally controls the pressure. In general, the pressure should be sufficiently high to allow the precursor to saturate the surface with chemisorbed species, the reagent to react completely with the surface species left by the precursor and leave behind reactive sites for the next cycle of the precursor. If the chamber pressure is too low, which may occur if the dosing of precursor and/or reagent is too low, and/or if the pump rate is too high, the surfaces may not be saturated by the precursors and the reactions may not be self limited. This can result in an uneven thickness in the deposited layers. Furthermore, the chamber pressure should not be so high as to hinder the removal of the reaction products generated by the reaction of the precursor and reagent. Residual byproducts may interfere with the saturation of the surface when the next dose of precursor is introduced into the chamber. In some embodiments, the chamber pressure is maintained between about 0.01 Torr and about 100 Torr (e.g., between about 0.1 Torr and about 20 Torr, between about 0.5 Torr and 10 Torr, such as about 1 Torr).

Generally, the amount of precursor and/or reagent introduced during each cycle can be selected according to the size of the chamber, the area of the exposed substrate surfaces, and/or the chamber pressure. The amount of precursor and/or reagent introduced during each cycle can be determined empirically.

The amount of precursor and/or reagent introduced during each cycle can be controlled by the timing of the opening and closing of valves 152, 162, 182, and 192. The amount of precursor or reagent introduced corresponds to the amount of time each valve is open each cycle. The valves should open for sufficiently long to introduce enough precursor to provide adequate monolayer coverage of the substrate surfaces. Similarly, the amount of reagent introduced during each cycle should be sufficient to react with substantially all precursor deposited on the exposed surfaces. Introducing more precursor and/or reagent than is necessary can extend the cycle time and/or waste precursor and/or reagent. In some embodiments, the precursor dose corresponds to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more). Similarly, the reagent dose can correspond to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more)

The time between precursor and reagent doses corresponds to the purge. The duration of each purge should be sufficiently long to remove residual precursor or reagent from the chamber, but if it is longer than this it can increase the cycle time without benefit. The duration of different purges in each cycle can be the same or can vary. In some embodiments, the duration of a purge is about 0.1 seconds or more (e.g., about 0.2 seconds or more, about 0.3 seconds or more, about 0.4 seconds or more, about 0.5 seconds or more, about 0.6 seconds or more, about 0.8 seconds or more, about one second or more, about 1.5 seconds or more, about two seconds or more). Generally, the duration of a purge is about 10 seconds or less (e.g., about eight seconds or less, about five seconds or less, about four seconds or less, about three seconds or less).

The time between introducing successive doses of precursor corresponds to the cycle time. The cycle time can be the same or different for cycles depositing monolayers of different materials. Moreover, the cycle time can be the same or different for cycles depositing monolayers of the same material, but using different precursors and/or different reagents. In some embodiments, the cycle time can be about 20 seconds or less (e.g., about 15 seconds or less, about 12 seconds or less, about 10 seconds or less, about 8 seconds or less, about 7 seconds or less, about 6 seconds or less, about 5 seconds or less, about 4 seconds or less, about 3 seconds or less). Reducing the cycle time can reduce the time of the deposition process.

The precursors are generally selected to be compatible with the ALD process, and to provide the desired deposition materials upon reaction with a reagent. In addition, the precursors and materials should be compatible with the material on which they are deposited (e.g., with the substrate material or the material forming the previously deposited layer). Examples of precursors include chlorides (e.g., metal chlorides), such as $TiCl_4$, $SiCl_4$, $SiH_2Cl_2$, $TaCl_3$, $HfCl_4$, $InCl_3$ and $AlCl_3$. In some embodiments, organic compounds can be used as a precursor (e.g., Ti-ethaOxide, Ta-ethaOxide, Nb-ethaOxide). Another example of an organic compound precursor is $(CH_3)_3Al$.

The reagents are also generally selected to be compatible with the ALD process, and are selected based on the chemistry of the precursor and material. For example, where the material is an oxide, the reagent can be an oxidizing agent. Examples of suitable oxidizing agents include water, hydrogen peroxide, oxygen, ozone, $(CH_3)_3Al$, and various alcohols (e.g., Ethyl alcohol $CH_3OH$). Water, for example, is a suitable reagent for oxidizing precursors such as $TiCl_4$ to obtain $TiO_2$, $AlCl_3$ to obtain $Al_2O_3$, and Ta-ethaoxide to obtain $Ta_2O_5$, Nb-ethaoxide to obtain $Nb_2O_5$, $HfCl_4$ to obtain $HfO_2$, $ZrCl_4$ to obtain $ZrO_2$, and $InCl_3$ to obtain $In_2O_3$. In each case, HCl is produced as a byproduct. In some embodiments, $(CH_3)_3Al$ can be used to oxidize silanol to provide $SiO_2$.

Figure 3:
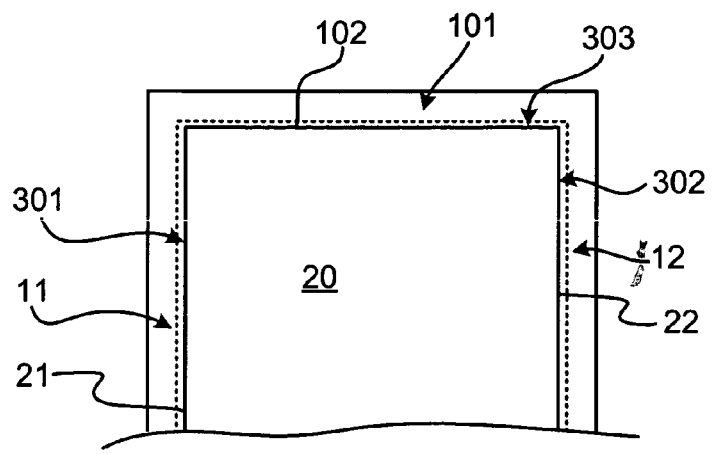
FIG. 3 is a cross-sectional view of contiguous multilayer films deposited on contiguous surfaces of a substrate.

Referring to FIG. 3, as discussed previously, the ALD process forms a multilayer film on edge surface 101 of substrate 20 in addition to multilayer films 11 and 12 on surfaces 21 and 22, respectively. Due to the nature of the ALD process, multilayer film 101 has the same composition and thickness as multilayer films 11 and 12, and is contiguous with multilayer films 11 and 12. Moreover, each layer in multilayer film 101 is contiguous with corresponding layers in multilayer films 11 and 12. One such layer, layer 303, is shown in FIG. 3. Layer 303 has the same composition and thickness as a corresponding layer 301 in multilayer film 11 and a layer 302 in multilayer film 12.

In some embodiments, ALD can be used to substantially coat all surfaces of a substrate, encapsulating the substrate. This can be performed by exposing some of surface area of a substrate during an initial ALD run, and coating the remaining surface area in a second ALD run in which the orientation of the substrate in the chamber is varied to expose previously covered surface area. Optionally, surfaces coated in the earlier ALD run can be covered in the second run so that substantially the same amount of material is deposited on each. Alternatively, surface area not coated during the initial ALD run can be sealed using some other coating method. Encapsulating the substrate may be advantageous where the substrate material is susceptible to environmental damage and/or the materials forming the films are particularly resistant to environmental hazards.

While certain embodiments have been described, other embodiments are possible.

As an example, while the preparation of IR filter films using ALD has been described, ALD can be used to form other types of films, such as, for example, antireflection films, UV cut-off filters, narrow-band filters, DWDM filters, phase compensators, high reflection mirrors, and/or waveguide layers.

As another example, while films having a certain number of layers have been described, more generally, a film can have one or more (e.g., two, three, four, five, six, seven, eight, nine, 10, 11, 12, 13, 14, 15) layers. Typically, the number of layers of a multilayer film is selected based on the desired optical properties of the film. In some embodiments (e.g., where a multilayer film includes materials having different thermo-mechanical properties (e.g., different coefficients of thermal expansion), many layered films may experience greater mechanical stress than comparable films with fewer layers if subjected to thermal cycling. In some embodiments, a multilayer film may include more than 15 layers (e.g., about 20 layers or more, about 30 layers or more, about 40 layers or more, about 50 layers or more).

While the range of layer thickness in multilayer films 11 and 12 are between about 20 nm and 1,000 nm, ALD can be used to deposit film layers that are thicker or thinner than these values. Layers can be as thin as a single monolayer (e.g., about 0.3 nm to about 2 nm) up to several thousand nanometers thick (e.g., about 2,000 nm or more, about 3,000 nm or more, about 5,000 nm or more). For example, in some embodiments, the thickness of one or more layers can be substantially less than optical wavelengths (e.g., substantially less than 200 nm). For example, certain layers can have a thickness of about 20 nm or less (e.g., about 15 nm or less, about 10 nm or less, about eight nm or less, about five nm or less, about two nm or less). In some embodiments, the thickness of a layer can correspond to about 20 monolayers of material or less (e.g., about 15 monolayers or less, about 10 monolayers or less, about eight monolayers or less, about five monolayers or less, three monolayers or less, two monolayers, one monolayer), where monolayer thickness refers to the theoretical monolayer thickness discussed previously. Where the thickness of layers in a film are substantially less than optical wavelengths, the optical properties of the film will be an average of the optical properties (e.g., refractive index) of the materials composing the film. Films that include layers of materials that are substantially less than optical wavelengths are referred to as nanolaminates. In some embodiments, one or more portions of a film can be nanolaminates. The nanolaminate portions can function like a layer with a homogeneous index of refraction that is an effective average of the indices of refraction of the materials forming the nanolaminate. In some embodiments, nanolaminates can be used to form graded index portions in a multilayer film. Examples of nanolaminate portions include portions composed of $SiO_2$ monolayers and $TiO_2$ monolayers, or $SiO_2$ monolayers and $Ta_2O_3$ monolayers.

Furthermore, while multilayer films 11 and 12 are each composed of layers of two different materials, in general, films may include layers of more than two different dielectric materials. For example, while all the high index layers in the described embodiments are formed from the same material, in general, the high index layers may be formed from the same or different materials. Similarly, the layers of the low index materials may be formed from the same or different materials. In general, the number of different material layers in a multilayer film may vary as desired.

Furthermore, while the monolayers forming multilayer films 11 and 12 are each formed from a single dielectric material, in some embodiments, the composition of deposited layer can include more than one material. For example, by simultaneously introducing more than one precursor into chamber 110, a monolayer of two or more different materials can be formed. The composition of each monolayer in a layer can be varied to tailor the refractive index profile of a film.

While films 11 and 12 are continuous over surfaces 21 and 22, in some embodiments, a film on a surface prepared using ALD may be discontinuous (e.g., patterned). Patterning may be performed during or after the ALD process. In embodiments where patterning is performed during ALD, portions of the substrate may be treated with a material to which the precursors and/or reagents do not adhere. No material is deposited in these portions, while the ALD process deposits layers of material in the untreated portions. For example, a hydrophobic material, such as a Teflon spray, could be coated onto portions of a surface to reduce water adsorption onto the surface. Alternatively, or additionally, portions of a substrate surface may be masked with a material that is removed after deposition, removing the portions of film deposited thereon.

Films can be patterned after their deposition using techniques such as photolithography. For example, an optical filter can be coated with a resist, which is subsequently patterned and etched to expose portions of the film. Etching the exposed portions and subsequent removal of residual resist results in a patterned film.

Although substrate 10 is an optical flat composed of glass, in general, the composition and shape of a substrate can vary. In general, the substrate can be formed from any material compatible with the deposited materials, precursors, reagents, and the deposition conditions. Suitable substrate materials may include a glass (e.g., borosilicate glass, quartz, soda-lime glass, glass-ceramic), metals (e.g., aluminum, stainless steel, nickel, copper), semiconductors (e.g., silicon, germanium), and/or polymers, such as thermoset polymers and thermoplastic polymers. Examples of polymers include polycarbonate, polyester, polypropylene, acrylic, liquid crystal polymer, polyethylterephthalate, polyamide, polyvinylchloride, and polyethylene.

The substrate may include materials that are sensitive to elevated temperatures, and may be damaged if exposed to elevated temperatures. In such situations, the substrate temperature should not be elevated to temperature that would damage the substrate during the deposition process. In some embodiments, substrate material may be unstable for temperatures of about 150° C. or more (e.g., about 170° C. or more, about 200° C. or more, about 300° C. or more, about 400° C. or more, about 500° C. or more). For example, a substrate material may undergo undesirable physical and/or chemical changes above a certain temperature. An example of an undesirable physical change is a phase change. A liquid crystal polymer substrate may become isotropic above a certain temperature, for example. Some substrate materials (e.g., some polymers) may undergo a glass transition above a certain temperature. For example, the substrate may include a material that has a glass transition temperature of about 150° C. or more (e.g., about 200° C. or more, about 300° C. or more, about 400° C. or more, about 500° C. or more). An example of a chemical change is oxidation of a substrate material (e.g., oxidation of a copper substrate).

The substrate material can have similar thermomechanical properties to one or more of the materials used to form the film(s). For example, a coefficient of thermal expansion (CTE) of the substrate material(s) can be similar to a CTE of one or more of the materials used to form the film(s). In some embodiments, the CTE of a substrate material may be within about 10% or less (e.g., about 8% or less, about 5% or less) of the CTE of a material used to form the film(s) over a range of temperatures over which the substrate is cycled during formation of the film(s) (e.g., from about 0° C. to about 300° C.). Matching the thermomechanical properties of materials in the substrate and films can reduce mechanical stress in the films that may accompany thermal cycling, which could otherwise result in cracking or other damage of the film(s).

In some embodiments, the substrate may be an optical element or a portion of an optical element. Optical elements include refractive elements (e.g., lenses), diffractive elements (e.g., diffractions gratings), reflectors (e.g., mirrors), and light emitting elements (e.g., light emitting diodes, lasers).

Figure 4:
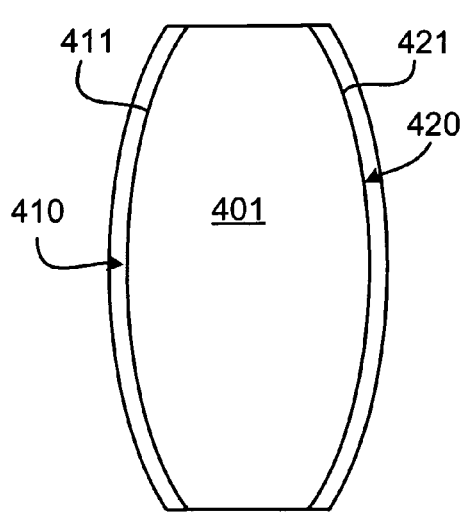
FIG. 4 is a cross-sectional view of a lens with films on opposing surfaces.

In some embodiments, the substrate surfaces that are coated using ALD can be substantially planar, such as surfaces 21 and 22 of substrate 10. As used herein, a substantially planar surface has a radius of curvature of 100 meters or more. Alternatively, the coated surfaces may be curved. A curved surface has a radius of curvature of less than 100 meters. In some embodiments, a surface can be a structured surface. Structured surfaces refer to surfaces having discontinuities in the surface normal. Structured surfaces can have portions that are planar and/or portions that are curved. An example of a substrate with a curved surface is a lens, such as lens 401 in FIG. 4. Curved surfaces 411 and 421 of lens 401 are coated with films 410 and 420, respectively, using ALD. Films 410 and 420 conform to surfaces 411 and 421, having a uniform thickness across each surface. Films 410 and 420 may include a single layer or multiple layers of differing composition. In embodiments where films 410 and 420 are multilayer films, each layer in the multilayer films can have a uniform thickness across the film. Films 410 and 420 can be the same or different. For example, both films can form an optical filter, similar to films 11 and 12 discussed previously. In an alternative example, film 10 can be an optical filter, while film 420 can be an antireflection film. In embodiments where the films are identical, they can be formed simultaneously by exposing both surfaces 411 and 421 during the ALD process.

Generally, the curvature of the surfaces coated using ALD may vary. In some embodiments, a substrate can have a modestly curved surface, and can have a relatively large radius of curvature, such as about 1 meter or more (e.g., about 2 meters or more, about 3 meters or more, about 5 meters or more, about 10 meters or more, about 20 meters or more). Examples of substrate surface with low curvature include some lenses, such as certain lenses used in eyeglasses. Alternatively, in some cases, a substrate surface can have high curvature, and can have a relatively small radius of curvature, such as about 10 cm or less (e.g., about 8 cm or less, about 5 cm or less, about 3 cm or less, about 2 cm or less, about 1 cm or less, about 0.5 cm or less, about 0.1 cm or less). Examples of substrate surface with high curvature include various lenses, such as ball lenses.

Figure 5:
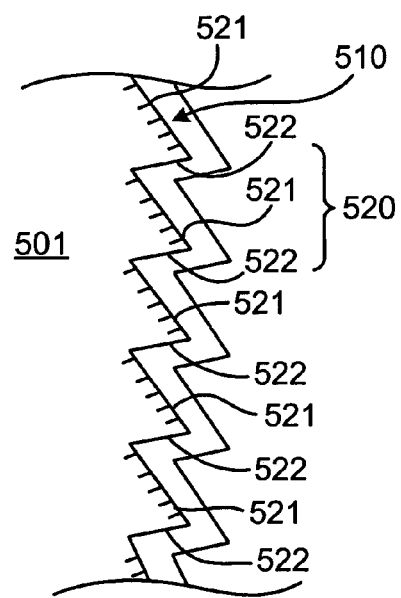
FIG. 5 is a cross-sectional view of a portion of a Fresnel lens with a film on the structured surface.

In some embodiments, the substrate can include one or more structured surface that is coated with a film using ALD. Referring to FIG. 5, an example of a structured surface is a surface 520 of a Fresnel lens 501. ALD can be used to deposit a film 510 (e.g., a single layer or multi layer film) on slopes 521 and drafts 522 of surface 520. The conformal nature of the ALD process results in film 510 having substantially uniform thickness on both slopes 521 and drafts 522. In some embodiments, film 510 is an antireflection film, which can reduce (e.g., eliminate) ghosting effects that may otherwise be experienced during use of the lens.

Other examples of structured surfaces that may be coated using ALD include grating structures, such as ruled gratings and relief gratings, cylindrical surfaces, such as the surface of an optical fiber or an inner surface of a hollow waveguide (e.g., having a circular, square or rectangular cross section). A further example is a cleaved surface of an optical fiber. For example, some telecommunications applications utilize design schemes in which a cleaved fiber is positioned very close to a lens or an optical component. Coating an AR film onto a cleaved surface using ALD can reduce reflections at the surface. Multiple cleaved surfaces can be coated in a single ALD run.

Figure 6:
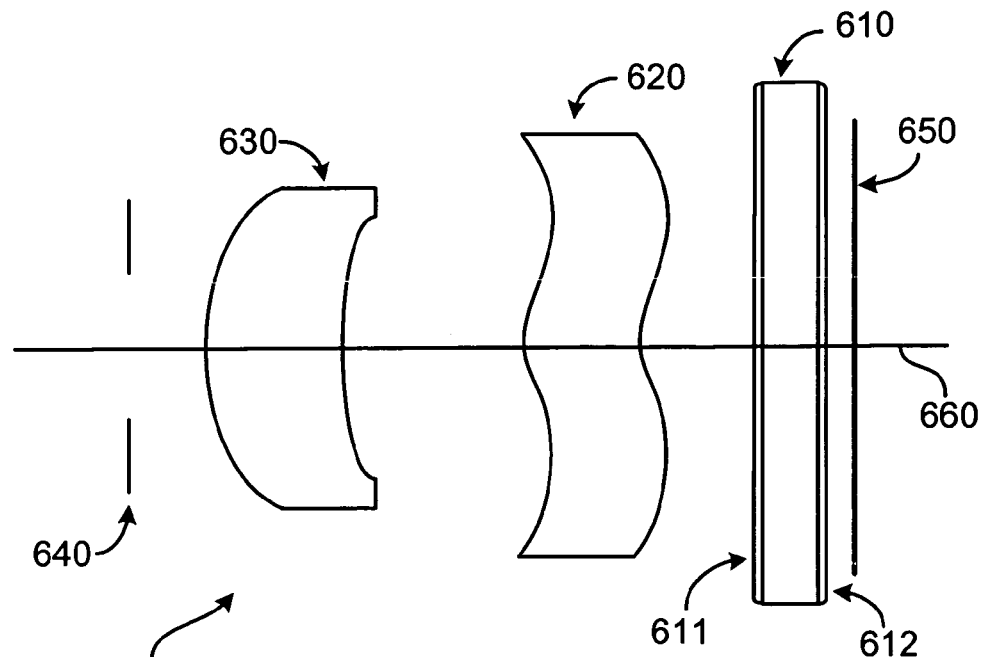
FIG. 6 is a schematic view of an imaging system including an optical filter.

Optical components formed using the methods disclosed herein can be used in a variety of optical systems. Referring to FIG. 6, in some embodiments, an IR filter 610 formed using ALD techniques is used in an imaging system 600. Imaging system includes lenses 620 and 630 which image light propagating relative to axis 660 admitted through an aperture 640 onto a detector 650 (e.g., a charge coupled device (CCD) or complementary metal oxide semiconductor (CMOS) detector) at an image plane. IR filter 610 is positioned between lens 620 and detector 650. IR filter 610 includes multilayer films 611 and 612, and reduces (e.g., substantially eliminates) the amount of IR light admitted through aperture 640 that impinges on detector 650. For example, IR filter can reduce the amount of light at a block wavelength by about 20% or more (e.g., about 50% or more, about 80% or more, about 90% or more, about 95% or more). In some embodiments, IR filter 610 has a transmission spectrum similar to the spectrum shown in FIG. 1C.

Figure 7:
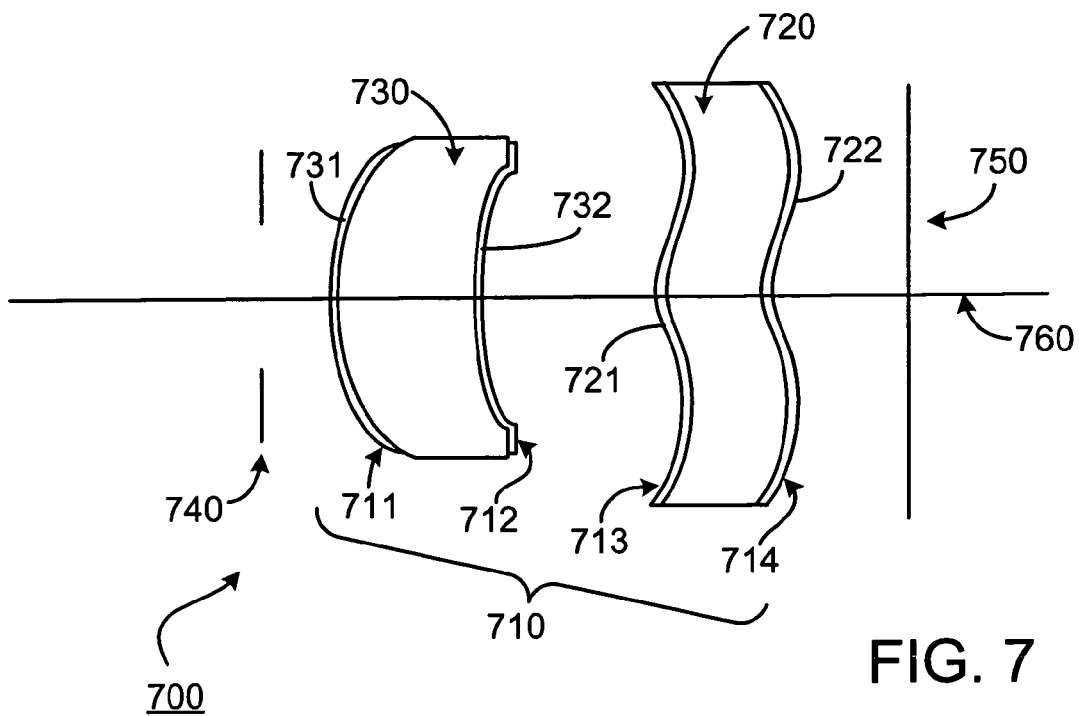
FIG. 7 is a schematic view of another imaging system including an optical filter.

In some embodiments, ALD may be used to integrate optical components in an optical system. For example, discrete IR filter 610 in imaging system 600 can be replaced with a filter coated directly onto one or more surfaces of the lenses in an imaging system. For example, referring to FIG. 7, an imaging system 700 includes a pair of lenses 720 and 730, which image light propagating relative to axis 760 admitted through an aperture 740 onto a detector 750. An optical filter 710 includes multilayer films 713, 714, 711, and 712 deposited on surfaces 721, 722, 731, and 732 of lenses 720 and 730, respectively. Like IR filter 610 shown in FIG. 6, optical filter 710 reduces (e.g., substantially eliminates) the amount of IR light admitted through aperture 740 that impinges on detector 750.

Figure 8:
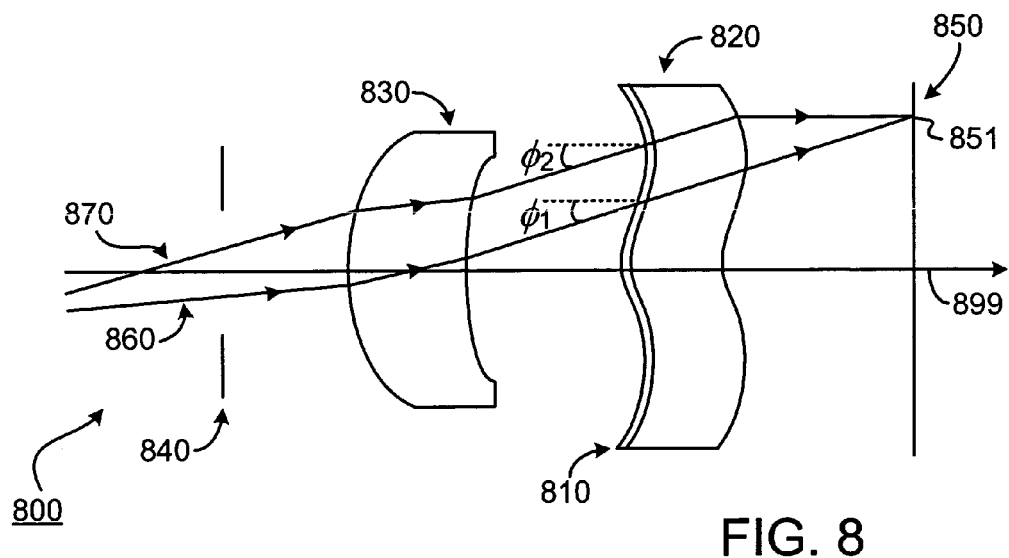
FIG. 8 is a schematic view of a further imaging system including an optical filter.

In a further embodiment, FIG. 8 shows an imaging system 800 including an IR filter 810, which is deposited on a single surface 821 of a lens 820. Imaging system 800 also includes a second lens 830, a detector 850, and an aperture 840. Lenses 820 and 830 image light admitted through aperture 840 onto detector 850. Surface 821 corresponds to the lens surface where the divergence of imaged rays is smallest. In other words, a maximum difference in the propagating direction of imaged rays is less than a maximum difference in the propagation direction of imaged rays at other surfaces of lenses 720 and 730. Accordingly, the maximum blue shift associated with the band edge of the filter is less when the filter is located on surface 810 than it would be if located on other surfaces in imaging system 800.

Ray divergence is illustrated by rays 860 and 870, which originate from a common source point and are imaged to a common point 851 on detector 850. The propagation angles of rays 860 and 870 with respect to an optical axis 899 of imaging system 800 are $\phi_1$ and $\phi_2$, respectively. The divergence of the rays is the difference between $\phi_1$ and $\phi_2$. In some embodiments, rays of imaged light have a maximum divergence of about 20 degrees or less at IR filter 810 (e.g., about 15 degrees or less, about 10 degrees or less, about 8 degrees or less). Accordingly, the blue shift experienced by the system's marginal rays compared to rays propagating along axis 899 can be about 20 nm or less (e.g., about 15 nm or less, about 12 nm or less, about 10 nm or less).

Figure 9:
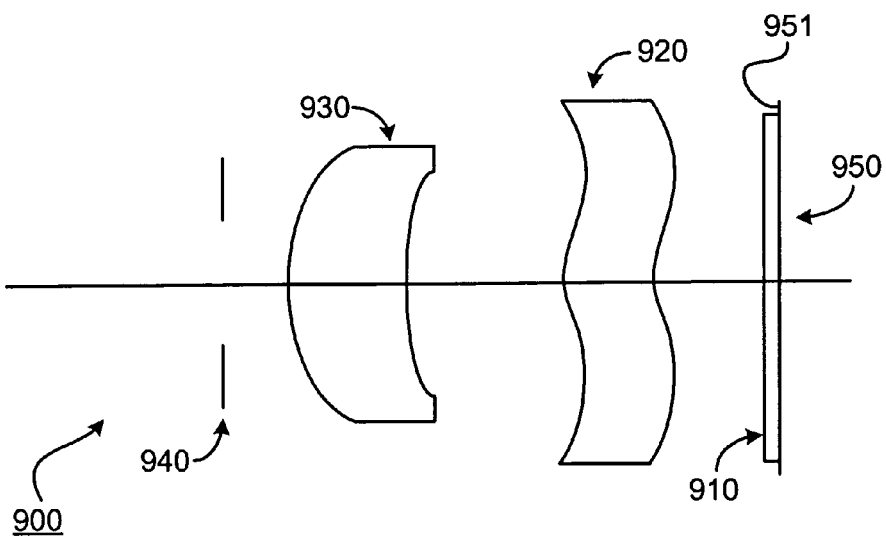
FIG. 9 is a schematic view of another imaging system including an optical filter.

In another embodiment, FIG. 9 shows an imaging system 900 including an IR filter 910, which is deposited on a surface 951 of a detector 950 (e.g., a CCD or CMOS detector). Imaging system 900 also includes a lens 920, a second lens 930, and an aperture 940. Lenses 920 and 930 image light admitted through aperture 940 onto detector 950.

Imaging systems, such as those discussed previously, may be used in electronic devices, such as digital cameras and digital camcorders. In some embodiments, the imaging systems may be used in digital cameras in cellular telephones.

The following examples are illustrative and not intended as limiting.

EXAMPLES

Example I

An optical filter was formed by depositing multilayer films on opposite sides of a BK7 optical flat (100 mm diameter), which was obtained from Abrisa (Santa Paula, Calif.). The optical flat was cleaned by removing insoluble organic contaminants with a $H_2O:H_2O_2:NH_4OH$ solution, and removing ionic and heavy metal atomic contaminants using a $H_2O:H_2O_2:HCl$ solution. The high index material was $TiO_2$ and the low index material was $Al_2O_3$. The precursor for the high index material was Ti-ethaoxide, 99.999% grade purity, obtained from Sigma-Aldrich (St. Louis, Mo.). The precursor for the low index material was $(CH_3)_3Al$, also 99.999% grade purity, obtained from Sigma-Aldrich (St. Louis, Mo.). For both materials, the reagent was deionized water, which was provided using a water deionizer obtained from Allied Water Technologies (Danbury, Conn.).

To deposit the multilayer films, the optical flat was placed in a P400A ALD reaction chamber, obtained from Planar Systems, Inc. (Beaverton, Oreg.). Air was purged from the chamber. Nitrogen was flowed through the chamber, maintaining the chamber pressure at about 1 Torr. The chamber temperature was set to 170° C. and left for about seven hours for the substrate to thermally equilibrate. Once thermal equilibrium was reached, an initial pulse of water, vapor was introduced into the chamber by opening the valve to the water supply for 0.7 seconds. After the valve to the water supply was closed, the chamber was purged by the nitrogen flow for three seconds. Next, the valve to the $(CH_3)_3Al$ was opened for 0.8 seconds, introducing $(CH_3)_3Al$ into the chamber. The chamber was again allowed to purge by the nitrogen flow for 1.5 seconds before another dose of water vapor was introduced. Alternating doses of water vapor (0.7 seconds) and $(CH_3)_3Al$ (0.8 seconds) were introduced between purges, resulting in a layer of $Al_2O_3$ being formed on the exposed surfaces of the substrate. Total cycle time was seven seconds. This cycle was repeated 95 times, resulting in $Al_2O_3$ layer having a thickness of 9.56 nm.

After depositing the $Al_2O_3$ layer, water vapor was introduced into the chamber in a two second pulse. This was followed by a two second purge, a one second pulse of Ti-ethaoxide, and another two second purge. This cycle was repeated 172 times, resulting in a 6.48 nm thick layer of $TiO_2$ being formed on the $Al_2O_3$ layer.

Additional layers of $Al_2O_3$ and $TiO_2$ were deposited using the steps outlined above to multilayer films on the exposed substrate surfaces. The thickness of each layer, and of deposition cycles used to deposit each layer are summarized in Table I.

TABLE I

| Layer No. | $Al_2O_3$ Layers Thickness (nm) | No. of Cycles | Layer No. | $TiO_2$ Layers Thickness (nm) | No. of Cycles |
|---|---|---|---|---|---|
| 1 | 9.56 | 95 | 2 | 6.48 | 172 |
| 3 | 55.63 | 551 | 4 | 20.71 | 551 |
| 5 | 49.71 | 492 | 6 | 18.88 | 502 |
| 7 | 39.36 | 390 | 8 | 96.86 | 2576 |
| 9 | 127.25 | 1259 | 10 | 79.18 | 2106 |
| 11 | 119.8 | 1186 | 12 | 76.72 | 2041 |
| 13 | 117.67 | 1164 | 14 | 75.87 | 2018 |
| 15 | 117.01 | 1158 | 16 | 75.67 | 2013 |
| 17 | 116.98 | 1158 | 18 | 75.7 | 2014 |
| 19 | 117.03 | 1158 | 20 | 76.93 | 2046 |
| 21 | 119.59 | 1183 | 22 | 82.97 | 2207 |
| 23 | 105.81 | 1047 | 24 | 3.22 | 86 |
| 25 | 29.9 | 296 | 26 | 105.85 | 2815 |
| 27 | 22.3 | 221 | 28 | 7.1 | 189 |
| 29 | 127.76 | 1264 | 30 | 99.21 | 2639 |
| 31 | 51.26 | 507 | 32 | 18.26 | 486 |
| 33 | 24.61 | 244 | 34 | 47.07 | 1252 |
| 35 | 4.4 | 44 | 36 | 17.41 | 463 |
| 37 | 128.82 | 1275 | 38 | 82.89 | 2205 |
| 39 | 137.68 | 1362 | 40 | 92.65 | 2464 |
| 41 | 8.64 | 86 | 42 | 10.28 | 273 |
| 43 | 154.44 | 1528 | 44 | 24.33 | 647 |
| 45 | 3.62 | 36 | 46 | 76.72 | 2041 |
| 47 | 153.64 | 1520 | 48 | 105.56 | 2808 |
| 49 | 156.42 | 1548 | 50 | 105.05 | 2794 |
| 51 | 156.48 | 1549 | 52 | 105.32 | 2801 |
| 53 | 155.2 | 1536 | 54 | 104.77 | 2787 |
| 55 | 154.23 | 1526 | 56 | 98.52 | 2620 |
| 57 | 129.08 | 1277 | 58 | 14.32 | 381 |
| 59 | 13.1 | 130 | 60 | 49.28 | 1311 |
| 61 | 69.86 | 691 | 62 | | |

Figure 10:
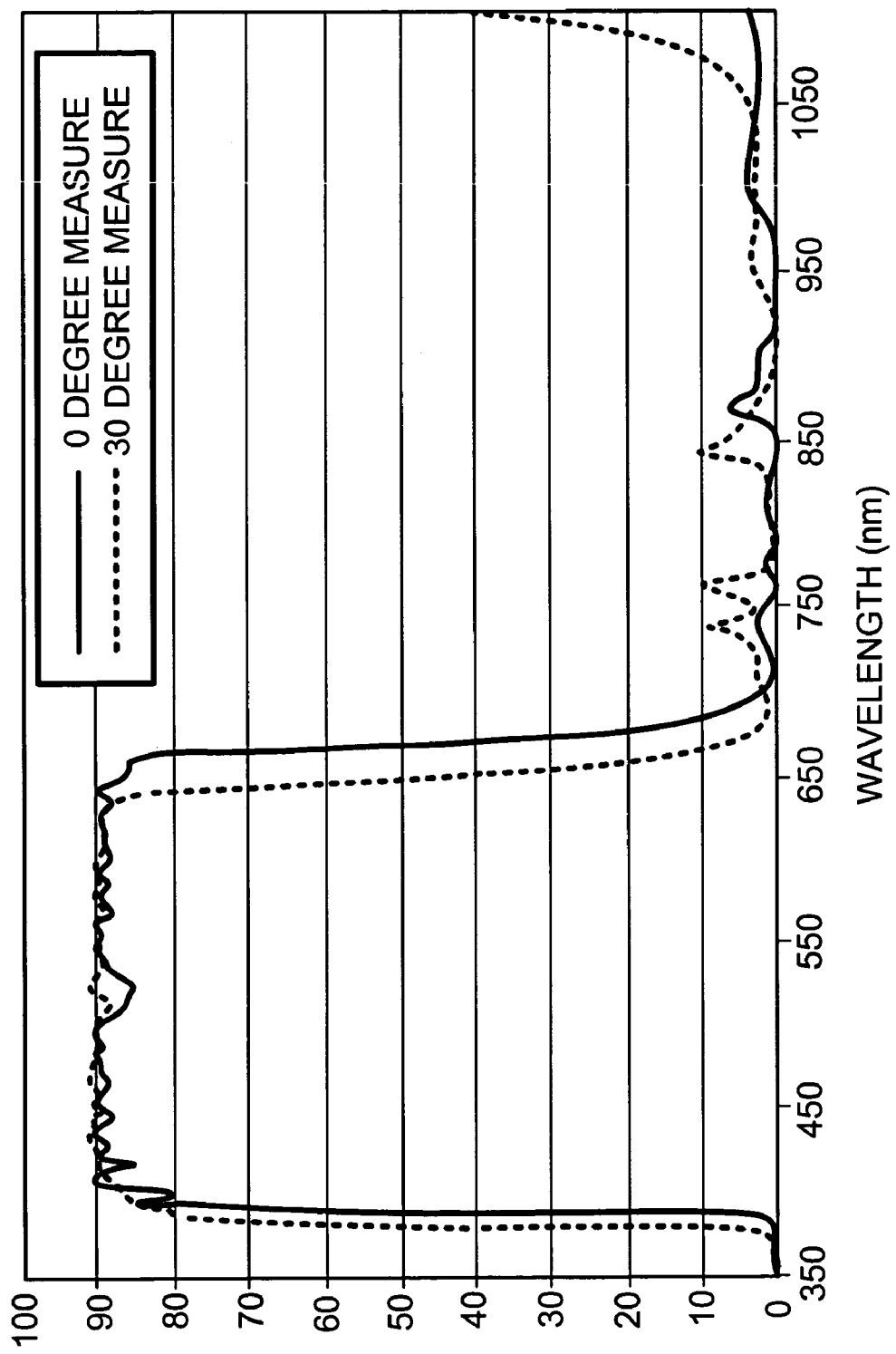
FIG. 10 is a transmission spectrum of an optical filter for light incident at 0° and 30°.

Referring to FIG. 10, the performance of the optical filter was investigated using a Lambda 14 UV/V is spectrometer, obtained from Perkin-Elmer (Wellesley, Mass.). The transmission spectrum of the optical filter was measured at 0° and 30° incidence. At 0°, the pass band extended from about 380 nm to about 680 nm. Transmission at these wavelengths out 90%. The optical filter substantially blocked light at wavelengths from about 690 nm to about 1,100 nm. The band edge at 680 nm shifted by about 20 nm to about 650 nm for dent at 30°.

TABLE II

| Layer No. | $Al_2O_3$ Layers Thickness (nm) | No. of Cycles | Layer No. | $TiO_2$ Layers Thickness (nm) | No. of Cycles |
|---|---|---|---|---|---|
| 1 | 41.51 | 411 | 2 | 8.47 | 221 |
| 3 | 29.73 | 294 | 4 | 89.25 | 2329 |
| 5 | 127.44 | 1261 | 6 | 79.52 | 2075 |
| 7 | 119.16 | 1179 | 8 | 77.71 | 2028 |
| 9 | 117.56 | 1163 | 10 | 79.33 | 2070 |
| 11 | 125.63 | 1243 | 12 | 11.66 | 304 |
| 13 | 21.64 | 214 | 14 | 15.41 | 402 |
| 15 | 129.94 | 1286 | 16 | 78.52 | 2049 |
| 17 | 117.08 | 1159 | 18 | 76.5 | 1995 |
| 19 | 117.2 | 1160 | 20 | 77.56 | 2024 |
| 21 | 120.61 | 1194 | 22 | 82.66 | 2157 |
| 23 | 138.9 | 1374 | 24 | 91.7 | 2393 |
| 25 | 6.11 | 60 | 26 | 10.19 | 266 |
| 27 | 146.04 | 1445 | 28 | 99.41 | 2594 |
| 29 | 33.44 | 331 | 30 | 16.07 | 419 |
| 31 | 24.47 | 242 | 32 | 87.07 | 2272 |
| 33 | 129.63 | 1283 | 34 | 86.99 | 2270 |
| 35 | 142.96 | 1415 | 36 | 102.91 | 2686 |
| 37 | 37.76 | 374 | 38 | 1.19 | 31 |
| 39 | 112.79 | 1116 | 40 | 101.71 | 2654 |
| 41 | 133.7 | 1323 | 42 | 1.82 | 47 |
| 43 | 19.92 | 197 | 44 | 102.18 | 2667 |
| 45 | 147.2 | 1457 | 46 | 98.22 | 2563 |
| 47 | 33.3 | 330 | 48 | 6.1 | 159 |
| 49 | 138.14 | 1367 | 50 | 12.82 | 335 |

TABLE II-continued

| Layer No. | Al₂O₃ Layers Thickness (nm) | No. of Cycles | Layer No. | TiO₂ Layers Thickness (nm) | No. of Cycles |
|---|---|---|---|---|---|
| 51 | 35.08 | 347 | 52 | 105.85 | 2762 |
| 53 | 147.48 | 1459 | 54 | 97.71 | 2550 |
| 55 | 7.44 | 74 | 56 | 5.74 | 150 |
| 57 | 147.74 | 1462 | 58 | 97.34 | 2540 |
| 59 | 122.3 | 1210 | 60 | 10.55 | 275 |
| 61 | 15.77 | 156 | 62 | 51.44 | 1342 |
| 63 | 68.84 | 681 | | | |

Example II

An optical filter is formed using the method described in Example I. The high index material is $TiO_2$ and the low index material is $Al_2O_3$. The precursor for the high index material is Ti-ethaoxide and the precursor for the low index material is TMA. For both materials, the reagent is deionized water.

Initially, a 307.7 nm thick $Al_2O_3$ buffer layer is deposited. This layer is formed by 3045 ALD cycles. The thickness of each additional layer, and number of deposition cycles used to deposit each layer are summarized in Table I. The cycle times are the same as those described in Example I.

Figure 11:
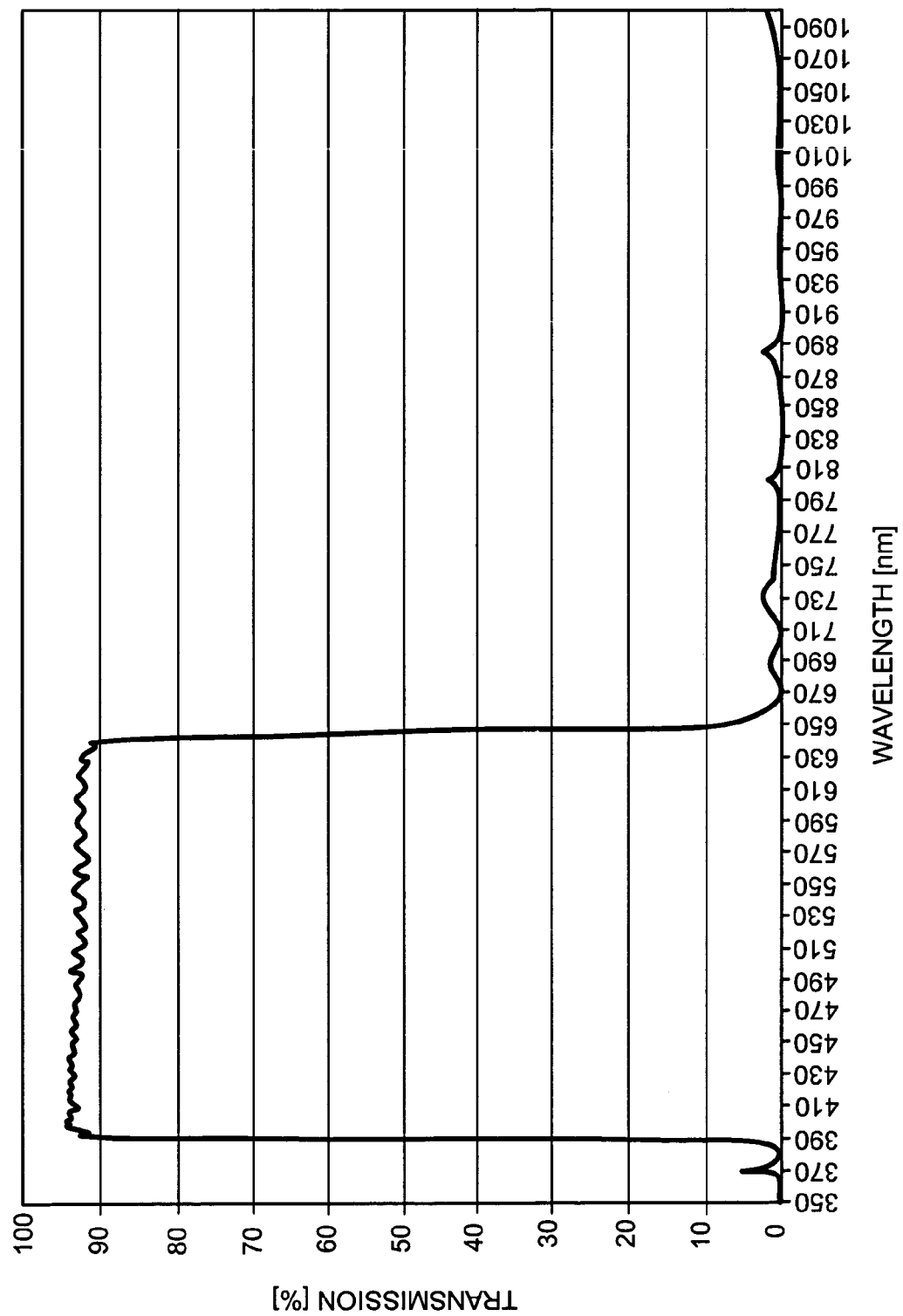
FIG. 11 is a transmission spectrum of another optical filter for light incident at 0°.

Referring to FIG. 11, the performance of the optical filter is investigated using a spectrometer. The transmission spectrum of the optical filter is measured at 0°. At 0° incidence, the pass band extends from about 390 nm to about 650 nm. Transmission at these wavelengths is between about 92% and about 94%. The optical filter substantially blocks light at wavelengths from about 670 nm to about 1,100 nm.

Other embodiments are in the following claims.

What is claimed is:

1. An optical system, comprising:
a lens for imaging light from an object to an image plane;
an optical filter comprising a plurality of layers positioned relative to the lens to reduce an amount of focused light of a wavelength $\lambda$ by about 20 percent or more at the image plane relative to an identical optical system without the optical filter; and
a detector positioned at the image plane,
wherein one of the layers is disposed on a first surface of the lens and the optical filter is disposed on a surface of the detector.

2. The optical system of claim 1, wherein the first surface has a radius of curvature of about two meters or less.

3. The optical system of claim 1, wherein the image plane is about 5 cm or less from the lens.

4. The optical system of claim 1, wherein the image plane is about 1 cm or less from the lens.

5. The optical system of claim 1, wherein the image plane is about 0.5 cm or less from the lens.

6. The optical system of claim 1, wherein the detector is a charge coupled device array or complementary metal oxide semiconductor array.

7. The optical system of claim 1, wherein the plurality of layers comprise a plurality of dielectric layers.

8. The optical system of claim 1, wherein alternating layers of the plurality of layers have different refractive indices.

9. The optical system of claim 1, wherein the plurality of layers comprises a layer disposed on a second surface of the lens opposite the first surface.

10. The optical system of claim 1, wherein $\lambda$ is about 650 nm or more.

11. The optical system of claim 1, wherein $\lambda$ is between about 650 nm and 1,100 nm.

12. The optical system of claim 1, wherein the optical filter reduces focused light of wavelength $\lambda$ by about 50 percent or more at the image plane.

13. The optical system of claim 1, wherein the optical filter reduces focused light of wavelength $\lambda$ by about 80 percent or more at the image plane.

14. The optical system of claim 1, wherein the optical filter reduces focused light of wavelength $\lambda$ by about 90 percent or more at the image plane.

15. The optical system of claim 1, wherein the optical filter reduces focused light of wavelength $\lambda$ by about 95 percent or more at the image plane.

16. The optical system of claim 1, further comprising a second lens for imaging light from the object to the image plane, wherein the one of the layers of the optical filter is disposed on a surface of the second lens.

17. The optical system of claim 1, wherein rays of imaged light have a maximum divergence of about 20 degrees or less at the first surface.

18. The optical system of claim 1, wherein rays of imaged light have a maximum divergence of about 15 degrees or less at the first surface.

19. The optical system of claim 1, wherein rays of imaged light have a maximum divergence of about 10 degrees or less at the first surface.

20. The optical system of claim 1, wherein the optical filter is positioned between the lens and the image plane.

21. A digital camera comprising the optical system of claim 1.

22. A cell phone comprising the digital camera of claim 21.

* * * * *